US012634941B2

(12) United States Patent
Guo et al.

(10) Patent No.: US 12,634,941 B2
(45) Date of Patent: May 19, 2026

(54) DYNAMIC INDICATION OF UPLINK TRANSMISSION PARAMETERS VIA CONFIGURED GRANT-UCI (CG-UCI)

(71) Applicant: QUALCOMM Incorporated, San Diego, CA (US)

(72) Inventors: Shaozhen Guo, Beijing (CN); Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 18/006,427

(22) PCT Filed: Oct. 2, 2020

(86) PCT No.: PCT/CN2020/119798
§ 371 (c)(1),
(2) Date: Jan. 23, 2023

(87) PCT Pub. No.: WO2022/067864
PCT Pub. Date: Apr. 7, 2022

(65) Prior Publication Data
US 2023/0362938 A1 Nov. 9, 2023

(51) Int. Cl.
*H04W 72/21* (2023.01)
*H04L 1/1812* (2023.01)
*H04W 72/12* (2023.01)

(52) U.S. Cl.
CPC ........... *H04W 72/21* (2023.01); *H04L 1/1812* (2013.01); *H04W 72/12* (2013.01)

(58) Field of Classification Search
CPC ......... H04W 72/14; H04L 12/28; H04L 12/50
(Continued)

(56) References Cited

U.S. PATENT DOCUMENTS

| | | | |
|---|---|---|---|
| 2017/0318575 A1 | 11/2017 | Park et al. | |
| 2019/0075589 A1* | 3/2019 | Jeon ...................... | H04W 72/20 |
| 2023/0180217 A1* | 6/2023 | Rossbach ............ | H04W 72/569 |
| | | | 370/329 |

FOREIGN PATENT DOCUMENTS

| | | |
|---|---|---|
| CN | 110557835 A | 12/2019 |
| CN | 111181693 A | 5/2020 |

(Continued)

OTHER PUBLICATIONS

International Search Report and Written Opinion—PCT/CN2020/119798—ISA/EPO—Jul. 2, 2021.

*Primary Examiner* — Dang T Ton

(74) *Attorney, Agent, or Firm* — Harrity & Harrity, LLP

(57) ABSTRACT

Wireless communication systems and methods related to dynamic indications of uplink transmission parameters via configured grant-UCI (CG-UCI) are provided. A user equipment (UE) receives, from a base station (BS), a first configuration indicating a first configured grant (CG) resource and a first transmission parameter associated with the first CG resource. The UE determines a second transmission parameter for transmitting a data block in the first CG resource. The second transmission parameter is different from the first transmission parameter. The UE transmits, to the BS in the first CG resource, a transmission including the data block and configured grant-uplink control information (CG-UCI) indicating the second transmission parameter, where the data block is transmitted based on the second transmission parameter.

18 Claims, 19 Drawing Sheets

1700

(58) Field of Classification Search
USPC ................................. 370/329, 401, 402, 403
See application file for complete search history.

(56) References Cited

FOREIGN PATENT DOCUMENTS

| | | | |
|---|---|---|---|
| WO | 2020033711 | A1 | 2/2020 |
| WO | 2020164013 | A1 | 8/2020 |

* cited by examiner

1600

Receive, from a base station (BS), a first configuration indicating a first configured grant (CG) resource and a first transmission parameter associated with the first CG resource — 1610

Determine a second transmission parameter for transmitting a data block in the first CG resource, the second transmission parameter being different from the first transmission parameter — 1620

Transmit, to the BS in the first CG resource, a transmission including the data block and configured grant-uplink control information (CG-UCI) indicating the second transmission parameter, the data block being based on the second transmission parameter. — 1630

FIG. 16

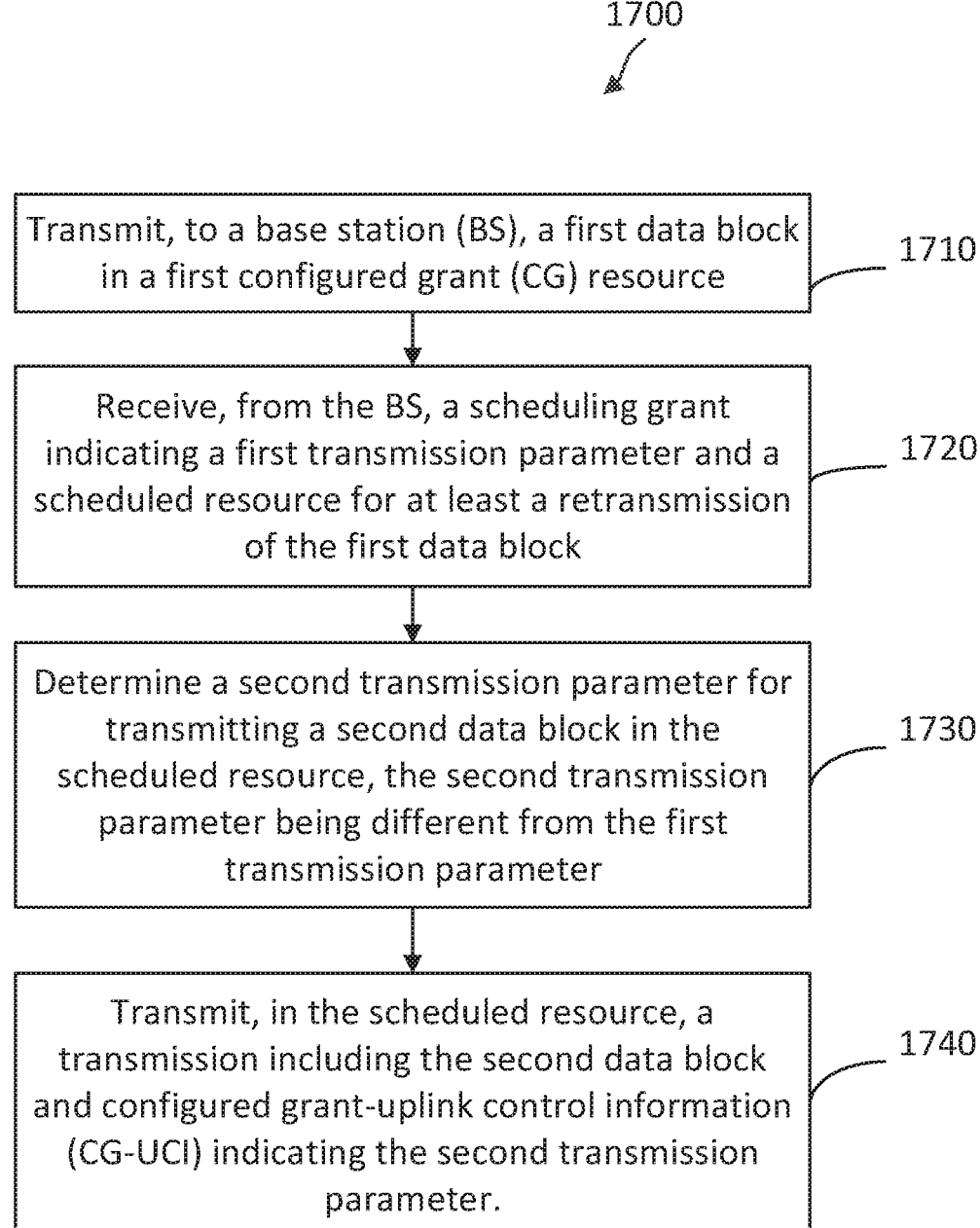

1700

Transmit, to a base station (BS), a first data block in a first configured grant (CG) resource — 1710

Receive, from the BS, a scheduling grant indicating a first transmission parameter and a scheduled resource for at least a retransmission of the first data block — 1720

Determine a second transmission parameter for transmitting a second data block in the scheduled resource, the second transmission parameter being different from the first transmission parameter — 1730

Transmit, in the scheduled resource, a transmission including the second data block and configured grant-uplink control information (CG-UCI) indicating the second transmission parameter. — 1740

Figure 18:
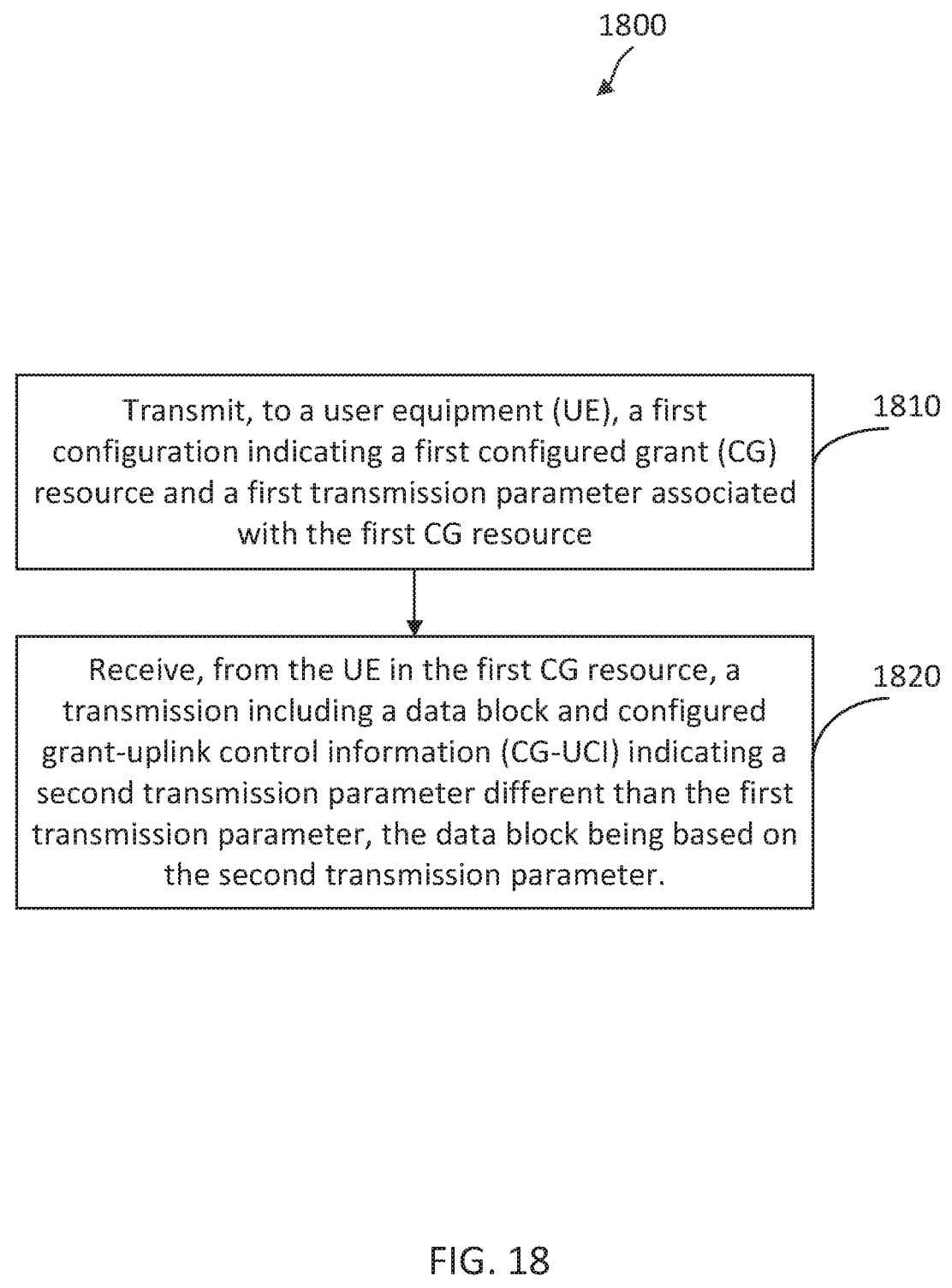

Transmit, to a user equipment (UE), a first configuration indicating a first configured grant (CG) resource and a first transmission parameter associated with the first CG resource — 1810

Receive, from the UE in the first CG resource, a transmission including a data block and configured grant-uplink control information (CG-UCI) indicating a second transmission parameter different than the first transmission parameter, the data block being based on the second transmission parameter. — 1820

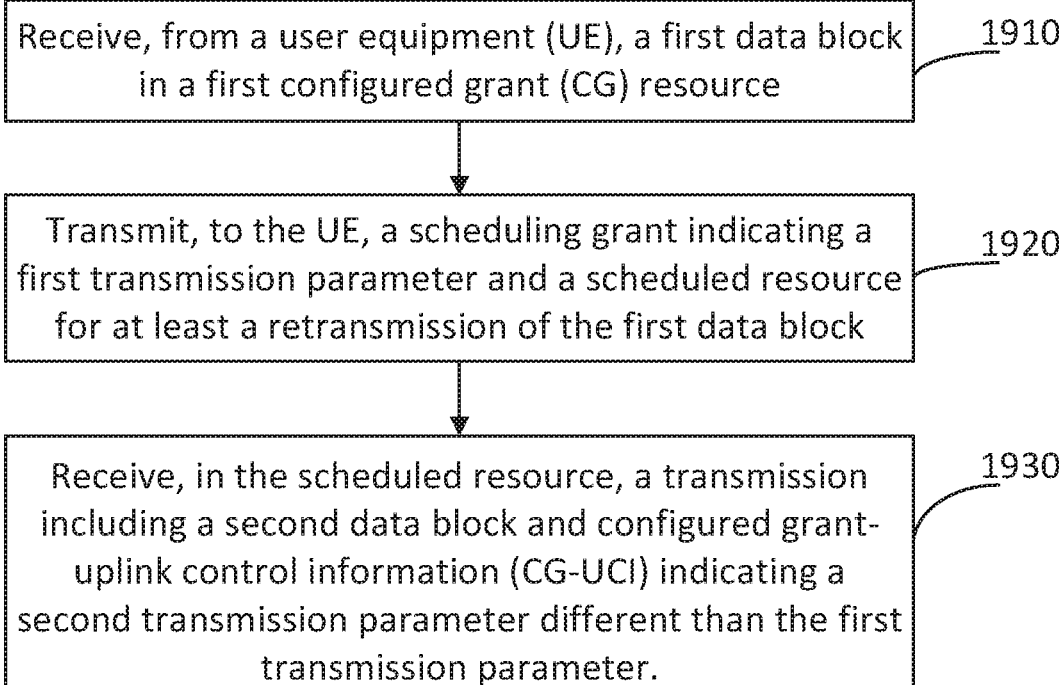

Receive, from a user equipment (UE), a first data block in a first configured grant (CG) resource    1910

Transmit, to the UE, a scheduling grant indicating a first transmission parameter and a scheduled resource for at least a retransmission of the first data block    1920

Receive, in the scheduled resource, a transmission including a second data block and configured grant-uplink control information (CG-UCI) indicating a second transmission parameter different than the first transmission parameter.    1930

FIG. 19

DYNAMIC INDICATION OF UPLINK TRANSMISSION PARAMETERS VIA CONFIGURED GRANT-UCI (CG-UCI)

CROSS-REFERENCE TO RELATED APPLICATIONS

The present application is a 35 U.S.C. 371 National Phase entry of Patent Cooperation Treaty (PCT) Application No. PCT/CN2020/119798, filed Oct. 2, 2020, which is hereby expressly incorporated herein by reference in its entirety.

TECHNICAL FIELD

This application relates to wireless communication systems and methods, and more particularly to dynamic indications of uplink transmission parameters via configured grant-uplink control information (CG-UCI).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may schedule a schedule a user equipment (UE) for UL and/or DL communications via a dynamic scheduling or a configured grant (CG) procedure. For dynamic scheduling, the BS may transmit a scheduling assignment or grant to schedule the UE for each and every UL transmission and/or each and every DL transmission. On the other hand, for CG-based transmissions, the BS may configure the UE with a set of resources, which may be referred to as CG resources, and the UE may transmit or receive in any of the CG resources without receiving a specific scheduling grant from the BS for each CG resource. There are two types of CGs, a CG type 1 and a CG type 2. For a CG type 1, the BS may preconfigure the UE with a CG configuration indicating an allocated resource and a periodicity for the allocated resource. For a CG type 2, the BS may preconfigure the UE with a CG configuration indicating a periodicity. The BS may activate the CG configuration by indicating a resource allocation for the CG configuration. Once activated, the resource allocation may repeat according to the preconfigured periodicity. In some instances, a CG transmission in a CG resource may also be referred to as a grant-less transmission, a grant-free transmission an unscheduled transmission, or an autonomous transmission. As use cases and diverse deployment scenarios continue to expand in wireless communication, CG-based transmission technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), the method including receiving, from a base station (BS), a first configuration indicating a first configured grant (CG) resource and a first transmission parameter associated with the first CG resource; determining a second transmission parameter for transmitting a data block in the first CG resource, the second transmission parameter being different from the first transmission parameter; and transmitting, to the BS in the first CG resource, a transmission including the data block and configured grant-uplink control information (CG-UCI) indicating the second transmission parameter, the data block being based on the second transmission parameter.

In an additional aspect of the disclosure, a method of wireless communication performed by a first user equipment (UE), the method including transmitting, to a base station (BS), a first data block in a first configured grant (CG) resource; receiving, from the BS, a scheduling grant indicating a scheduled resource for at least a retransmission of the first data block; and a first transmission parameter; determining a second transmission parameter for transmitting a second data block in the scheduled resource, the second transmission parameter being different from the first transmission parameter; and transmitting, in the scheduled resource, a transmission including the second data block and configured grant-uplink control information (CG-UCI) indicating the second transmission parameter.

In an additional aspect of the disclosure, a method of wireless communication performed by a base station (BS), the method including transmitting, to a user equipment (UE), a first configuration indicating a first configured grant (CG) resource and a first transmission parameter associated with the first CG resource; and receiving, from the UE in the first CG resource, a transmission including a data block and configured grant-uplink control information (CG-UCI) indicating a second transmission parameter different than the first transmission parameter, the data block being based on the second transmission parameter.

In an additional aspect of the disclosure, a method of wireless communication performed by a base station (BS), the method including receiving, from a user equipment (UE), a first data block in a first configured grant (CG) resource; transmitting, to the UE, a scheduling grant indicating a scheduled resource for at least a retransmission of the first data block; and a first transmission parameter; and receiving, in the scheduled resource, a transmission including a second data block and configured grant-uplink control information (CG-UCI) indicating a second transmission parameter different than the first transmission parameter.

In an additional aspect of the disclosure, a first user equipment (UE) including a transceiver configured to receive, from a base station (BS), a first configuration indicating a first configured grant (CG) resource and a first transmission parameter associated with the first CG resource; transmit, to the BS in the first CG resource, a transmission including a data block and configured grant-uplink control information (CG-UCI) indicating a second transmission parameter, the data block being based on the second transmission parameter; and a processor configured to determine the second transmission parameter for transmitting the data block in the first CG resource, the second transmission parameter being different from the first transmission parameter.

In an additional aspect of the disclosure, a first UE including a transceiver configured to transmit, to a base station (BS), a first data block in a first configured grant (CG) resource; receive, from the BS, a scheduling grant indicating a first transmission parameter and a scheduled resource for at least a retransmission of the first data block; and transmit, in the scheduled resource, a transmission including a second data block and configured grant-uplink control information (CG-UCI) indicating a second transmission parameter; and a processor configured to determine the second transmission parameter for transmitting the second data block in the scheduled resource, the second transmission parameter being different from the first transmission parameter.

In an additional aspect of the disclosure, a base station (BS) including a transceiver configured to transmit, to a user equipment (UE), a first configuration indicating a first configured grant (CG) resource and a first transmission parameter associated with the first CG resource; and receive, from the UE in the first CG resource, a transmission including a data block and configured grant-uplink control information (CG-UCI) indicating a second transmission parameter different than the first transmission parameter, the data block being based on the second transmission parameter.

In an additional aspect of the disclosure, a base station (BS) including a transceiver configured to receive, from a user equipment (UE), a first data block in a first configured grant (CG) resource; transmit, to the UE, a scheduling grant indicating a scheduled resource for at least a retransmission of the first data block; and a first transmission parameter; and receive, in the scheduled resource, a transmission including a second data block and configured grant-uplink control information (CG-UCI) indicating a second transmission parameter different than the first transmission parameter.

In an additional aspect of the disclosure, a non-transitory computer-readable medium having program code recorded thereon, the program code including code for causing a first user equipment (UE) to receive, from a base station (BS), a first configuration indicating a first configured grant (CG) resource and a first transmission parameter associated with the first CG resource; code for causing the first UE to determine a second transmission parameter for transmitting a data block in the first CG resource, the second transmission parameter being different from the first transmission parameter; and code for causing the first UE to transmit, to the BS in the first CG resource, a transmission including the data block and configured grant-uplink control information (CG- UCI) indicating the second transmission parameter, the data block being based on the second transmission parameter.

In an additional aspect of the disclosure, a non-transitory computer-readable medium having program code recorded thereon, the program code including code for causing a first user equipment (UE) to transmit, to a base station (BS), a first data block in a first configured grant (CG) resource; code for causing the first UE to receive, from the BS, a scheduling grant indicating a first transmission parameter and a scheduled resource for at least a retransmission of the first data block; code for causing the first UE to determine a second transmission parameter for transmitting a second data block in the scheduled resource, the second transmission parameter being different from the first transmission parameter; and code for causing the first UE to transmit, in the scheduled resource, a transmission including the second data block and configured grant-uplink control information (CG-UCI) indicating the second transmission parameter.

In an additional aspect of the disclosure, a non-transitory computer-readable medium having program code recorded thereon, the program code including code for causing a base station (BS) to transmit, to a user equipment (UE), a first configuration indicating a first configured grant (CG) resource and a first transmission parameter associated with the first CG resource; and code for causing the BS to receive, from the UE in the first CG resource, a transmission including a data block and configured grant-uplink control information (CG-UCI) indicating a second transmission parameter different than the first transmission parameter, the data block being based on the second transmission parameter.

In an additional aspect of the disclosure, a non-transitory computer-readable medium having program code recorded thereon, the program code including code for causing a base station (BS) to receive, from a user equipment (UE), a first data block in a first configured grant (CG) resource; code for causing the BS to transmit, to the UE, a scheduling grant indicating a scheduled resource for at least a retransmission of the first data block; and a first transmission parameter; and code for causing the BS to receive, in the scheduled resource, a transmission including a second data block and configured grant-uplink control information (CG-UCI) indicating a second transmission parameter different than the first transmission parameter.

In an additional aspect of the disclosure, a first user equipment (UE) including means for receiving, from a base station (BS), a first configuration indicating a first configured grant (CG) resource and a first transmission parameter associated with the first CG resource; means for determining a second transmission parameter for transmitting a data block in the first CG resource, the second transmission parameter being different from the first transmission parameter; and means for transmitting, to the BS in the first CG resource, a transmission including the data block and configured grant-uplink control information (CG-UCI) indicating the second transmission parameter, the data block being based on the second transmission parameter.

In an additional aspect of the disclosure, a first user equipment (UE) including means for transmitting, to a base station (BS), a first data block in a first configured grant (CG) resource; means for receiving, from the BS, a scheduling grant indicating a first transmission parameter and a scheduled resource for at least a retransmission of the first data block; means for determining a second transmission parameter for transmitting a second data block in the scheduled resource, the second transmission parameter being different from the first transmission parameter; and means for transmitting, in the scheduled resource, a transmission including the second data block and configured grant-uplink control information (CG-UCI) indicating the second transmission parameter.

In an additional aspect of the disclosure, a base station (BS) including means for transmitting, to a user equipment (UE), a first configuration indicating a first configured grant (CG) resource and a first transmission parameter associated with the first CG resource; and means for receiving, from the UE in the first CG resource, a transmission including a data block and configured grant-uplink control information (CG-UCI) indicating a second transmission parameter different than the first transmission parameter, the data block being based on the second transmission parameter.

In an additional aspect of the disclosure, a base station (BS) including means for receiving, from a user equipment (UE), a first data block in a first configured grant (CG) resource; means for transmitting, to the UE, a scheduling grant indicating a scheduled resource for at least a retransmission of the first data block; and a first transmission parameter; and means for receiving, in the scheduled resource, a transmission including a second data block and configured grant-uplink control information (CG-UCI) indicating a second transmission parameter different than the first transmission parameter.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIG. 16 is a flow diagram of a communication method according to some aspects of the present disclosure.

FIG. 17 is a flow diagram of a communication method according to some aspects of the present disclosure.

FIG. 18 is a flow diagram of a communication method according to some aspects of the present disclosure.

FIG. 19 is a flow diagram of a communication method according to some aspects of the present disclosure.

DETAILED DESCRIPTION

Figure 1:
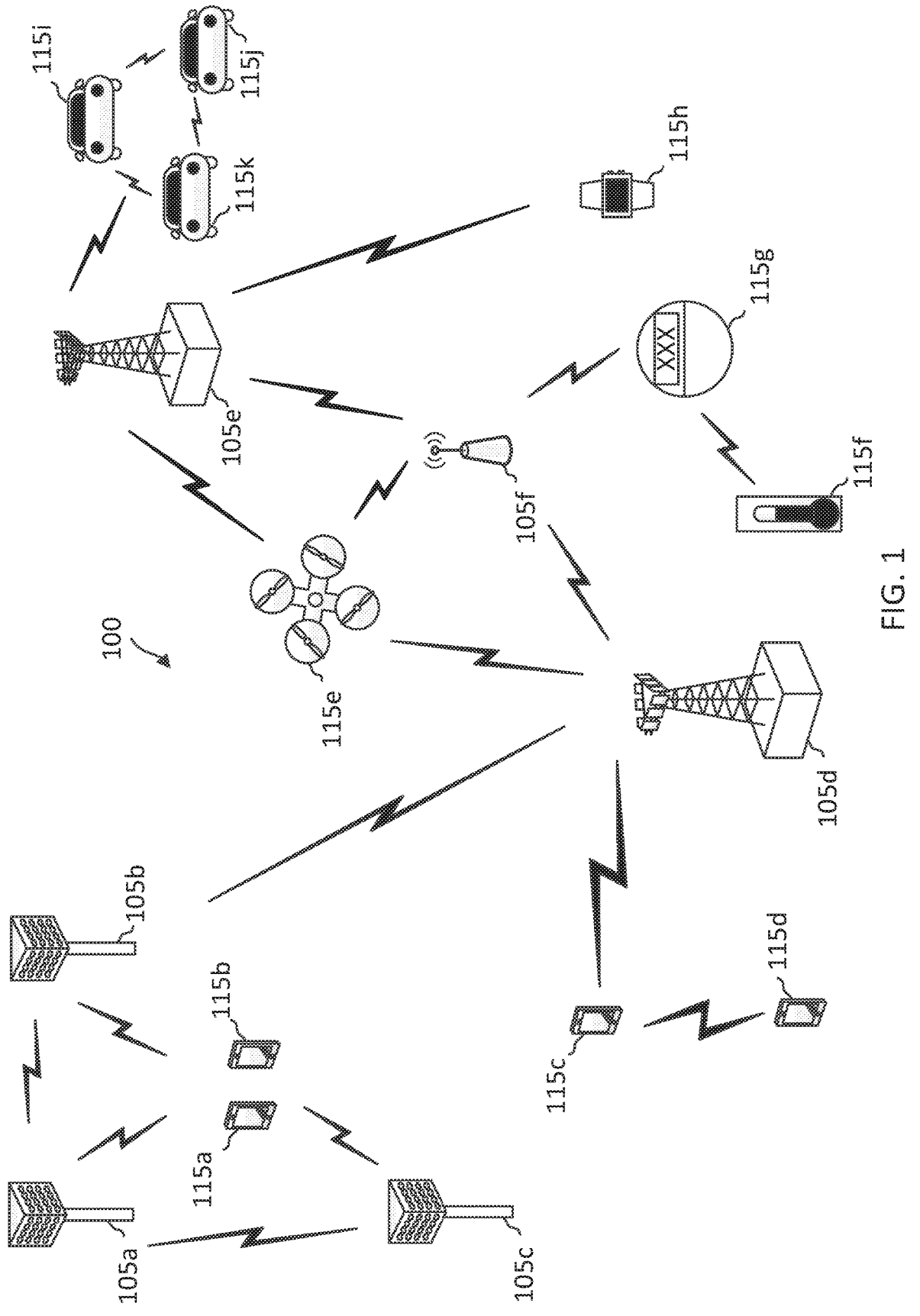
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a base station (BS) may configure a user equipment (UE) with multiple configured grant (CG) configurations via CG type 1 and/or CG type 2. Each CG configuration may include a resource allocation (e.g., indicating a set of periodic CG resources) and transmission parameters to be used for transmitting in the CG resources. Some examples of transmission parameters may include, but not limited to, modulation coding scheme (MCS), sounding reference signal resource indicator (SRI), and and/or precoding matrix indicator (PMI). Additionally, the BS may configure each CG configuration for use by a specific traffic flow (e.g., a medium access control (MAC) layer logical channel). Although the UE may transmit in a CG resource without a specific grant for the CG resource, the UE is expected to transmit data associated with the same specific traffic flow as configured by the CG configuration and using the same transmission parameters as configured by the CG configuration.

Further, in some aspects, the UE may be configured to perform autonomous retransmission. For instance, the UE may apply hybrid automatic repeat request (HARQ) techniques to a data block and transmit the HARQ data block to the BS using a CG resource configured for a traffic flow associated with the data block. If the BS successfully receives and decodes the data block, the BS may provide the UE with a HARQ acknowledgement (ACK) feedback. If, however, the BS fails to decode the data block, the BS may provide the UE with a negative-acknowledgement (NACK) feedback. Upon receiving a NACK feedback, the UE may retransmit the data block using a next CG resource associated with the same traffic flow. In some instances, the BS may fail to detect the data block, for example, due to a poor channel condition (e.g., a low signal-to-noise ratio (SNR)), and thus may not transmit any HARQ ACK/NACK feedback to the UE. Similarly, in some instances, the BS may transmit a HARQ ACK/NACK feedback to the UE, but the UE may fail to detect the HARQ ACK/NACK, for example, due to a poor channel configuration. To account for such transmission failures, the UE may start a retransmission timer after transmitting the data block in a CG resource, and retransmit the data block using a next CG resource associated with the same traffic flow if the retransmission timer expires before any feedback is received from the BS. In some instances, the UE may transmit an initial transmission of the data block using a first resource associated with a first CG configuration and may be allowed to utilize a second CG resource associated with a second, different CG configuration for the retransmission provided that the than the second CG resource is configured with the same transport block size (TBS) as the first CG resource.

In some other aspects, instead of an autonomous retransmission, the BS may provide the UE with a scheduled resource for retransmitting a data block that was transmitted in a CG resource. For instance, upon the BS detecting a failure in the decoding a CG transmission from the UE, the BS may transmit a dynamic scheduling grant to the UE to schedule the UE for a retransmission of the CG transmission. The dynamic scheduling grant may indicate a resource allocation and transmission parameters (e.g., MCS, SRI, and/or PMI) to be used for the retransmission in the scheduled resource.

As can be seen from the CG transmissions discussed above, CG transmissions can be inefficient in resource utilization as the UE is limited to use certain CG resources (e.g., of the same CG configuration and/or of the same TBS) for certain transmissions, and may not be allowed to use other CG resources of a different CG configuration or a different TBS.

In some aspects, a BS may communicate with a UE over a shared radio frequency band (e.g., in a shared spectrum or an unlicensed spectrum) shared by multiple network operating entities. One approach to avoiding collisions when communicating in the shared frequency is to use a listen-before-talk (LBT) procedure to ensure that the shared channel is clear before transmitting a signal in the shared channel. For example, a transmitting node (e.g., a BS or a UE) may perform LBT to determine whether there are active transmissions in the channel. If the LBT results in an LBT pass (indicating the channel is clear), the transmitting node may transmit a preamble to reserve a channel occupancy time (COT) in the shared channel and may communicate with a receiving node during the COT. If, however, the LBT fails (indicating the channel is busy), the transmitting node may refrain from accessing or transmitting in the channel. As such, a UE may not be able to gain access to the channel during some time periods. Hence, it may be desirable for a UE to determine what to transmit and how to transmit (e.g., what transmission parameters to use for the transmission) in a CG resource once the UE gains a transmission opportunity in the shared channel.

The present disclosure describes mechanisms for a UE to determine transmission parameters for transmitting in a CG resource or a scheduled resource associated with a CG transmission via CG-UCI. For example, a BS may configure the UE with multiple CG configurations. Each CG configuration may indicate a set of CG resources. The BS may assign each CG configuration to a specific traffic flow (e.g., MAC logical channel). The BS may also configure each CG configuration with transmission parameters (e.g., MCS, SRI, and precoding information) which the UE may use to transmit in corresponding set of CG resources. In some aspects, the UE may select a first CG resource from the sets of CG resources for transmitting a data block (e.g., a transport block (TB)). For instance, the first CG resource may be configured with a first transmission parameter (e.g., MCS, SRI, and precoding information). The UE may determine a second transmission parameter (e.g., MCS, SRI, and precoding information) different from the first transmission parameter. The UE may transmit a transmission including the data block using the second transmission parameter. The UE may also transmit CG-UCI along with the data block, where the CG-UCI may indicate the second transmission parameter. In some aspects, the UE may transmit the CG-UCI using the MCS configured for the first CG resource. Accordingly, the BS may receive the CG-UCI according to the configured MCS and may receive the data block based on the second transmission parameter indicated by the CG-UCI.

In some aspects, the first CG resource may be associated with a first traffic flow and the data block may be associated with a second traffic flow different from the first traffic flow. In some aspects, the first CG resource may be associated with a first TBS, and the data block may have a second TBS different from the first TBS. In some aspects, the transmission includes an initial transmission of the data block, and the UE may select the first CG resource based on an arrival time associated with the data block. In some aspects, the transmission includes a retransmission of the data block, and the UE may select the first CG resource based on a retransmission timer or an HARQ ACK/NACK associated with the data block. In some aspects, the UE may transmit multiple data blocks or TBs of different HARQ processes in the selected first CG resource. For instance, the UE may transmit a first data block and a second data block in the selected first CG resource, where each of the first data block and the second data block can be an initial transmission (a new transmission) or a retransmission of the respective data block. The UE may further indicate a number of data block in the transmission via the CG-UCI. In some aspects, the UE may utilize the same or common transmission parameters (e.g., MCS, SRI, and precoding information) for transmitting the first data block and the second data block. In some other aspects, the UE may utilize separate transmission parameters for the first and second data block.

In some aspects, the BS may provide the UE with a dynamic scheduling grant for retransmitting a CG transmission. For instance, the BS may fail to decode a data block in a first CG resource. Thus, the BS may transmit a scheduling grant indicating a scheduled resource for the UE to retransmit the data block. The scheduling grant may also indicate a transmission parameter (e.g., MCS, SRI, and precoding information) to be used for transmitting in the scheduled resource. The UE may determine a second transmission parameter (e.g., MCS, SRI, and precoding information) different from the first transmission parameter. The UE may transmit a transmission including the data block using the second transmission parameter. The UE may also transmit CG-UCI along with the data block, where the CG-UCI may indicate the second transmission parameter. In some aspects, the UE may transmit the CG-UCI using the MCS indicated by the scheduling grant. Accordingly, the BS may receive the CG-UCI according to the scheduled MCS and may receive the data block based on the second transmission parameter indicated by the CG-UCI.

In some aspects, the BS may schedule the UE to transmit multiple data blocks of different HARQ processes in the scheduled resource, where each of the data blocks can be an initial transmission (a new transmission) or a retransmission of the respective data block. In some aspects, the UE may determine the same or common transmission parameters (e.g., MCS, SRI, and precoding information) for transmitting all the data blocks. In some other aspects, the UE may determine separate transmission parameters for each of the data block. In some aspects, the UE may transmit a data block of a different HARQ processes than the scheduled HARQ process and may indicate the HARQ process in the CG-UCI.

Aspects of the present disclosure can provide several benefits. For example, allowing a UE to select a CG resource irrespective of a traffic flow or a TBS configured for the CG resource and to determine transmission parameters for transmitting in the selected CG resource can improve resource utilization efficiency, transmission performance, and/or transmission delays. Reporting actual transmission parameters for a transmission in a CG resource or a scheduled resource along with the transmission via CG-UCI can facilitate data reception and/or decoding at a BS. Scheduling multiple data blocks or TBs (e.g., of different HARQ processes) in a single scheduled resource via a single scheduling grant and/or transmitting multiple data blocks or TBs (e.g., of different HARQ processes) in a single CG resource can also reduce LBT overhead when operating over a shared radio frequency band.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI).

The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, a BS 105 may utilize both dynamic scheduling and a CG procedure for communications with a UE 115. For dynamic scheduling, the BS 105 may transmit a scheduling assignment or grant to schedule the UE 115 for each and every UL transmission and/or each and every DL transmission. For CG-based communications, the BS 105 may configure the UE 115 with a set of resources, which may be referred to as CG resources, and the UE 115 may transmit or receive in any of the CG resources without receiving a specific scheduling grant from the BS 105 for each CG resource.

In some aspects, a BS 105 may configure a UE 115 with multiple CG configurations via CG type 1 and/or CG type 2 for UL transmissions (e.g., configured grant-PUSCH (CG-PUSCH) transmissions) as discussed above. Each CG configuration may include a resource allocation (e.g., indicating a set of periodic CG resources) and transmission parameters to be used for transmitting in the CG resources. Some examples of transmission parameters may include, but not limited to, MCS, SRI, and/or PMI. Additionally, each CG configuration may be associated with a specific traffic flow (e.g., a MAC layer logical channel) and each CG resource is intended for transmitting a single TB. The CG resources for the different CG configurations may be within different time periods or different time slots.

In some aspects, the UE 115 may apply HARQ techniques to a data block (e.g., a transport block (TB)) and transmit the HARQ data block to the BS 105 using a CG resource configured for a traffic flow associated with the data block. If the BS 105 successfully receives and decodes the data block, the BS 105 may provide the UE 115 with a HARQ ACK feedback. If, however, the BS 105 fails to decode the data block, the BS 105 may provide the UE 115 with a HARQ NACK feedback. Upon receiving a NACK feedback, the UE 115 may retransmit the data block using a next CG resource associated with the same traffic flow. In some instances, the BS 105 may fail to detect the data block, for example, due to a poor channel condition (e.g., a low SNR), and thus may not transmit any HARQ ACK/NACK feedback to the UE 115. Similarly, in some instances, the BS 105 may transmit a HARQ ACK/NACK feedback to the UE 115, but the UE 115 may fail to detect the HARQ ACK/NACK, for example, due to a poor channel configuration. To account for such transmission failures, the UE 115 may start a retransmission timer after transmitting the data block in a CG resource, and retransmit the data block using a next CG resource associated with the same traffic flow if the retransmission timer expires and no feedback is received from the BS 105.

According to an aspect of the present disclosure, the UE 115 may select a first CG resource for transmitting a data block (e.g., TB) from the CG resources configured by the multiple CG configurations based on an arrival time of the data block or a HARQ feedback result associated with the data block. In other words, the UE 115 is allowed to transmit a data block in a CG resource that is associated with a different traffic flow than the data block and/or a different TBS than the data block. Since the UE 115 is transmitting a CG transmission in the CG resource that is different than the intended CG transmission configured for the CG resource, the UE 115 may determine transmission parameters (e.g., MCS, SRI, and/or PMI) for the actual CG transmission and include the determined transmission parameters in CG-UCI that is transmitted along with the data block in the CG transmission. In some aspects, the UE 115 may transmit multiple data blocks (e.g., multiple TBs) in a single CG resource. For instance, the UE 115 may communicate with the BS 105 over a shared radio frequency band (e.g., in a shared spectrum or an unlicensed spectrum) and may perform LBTs to contend for a transmission opportunity in the shared channel. As such, it may be desirable for the UE 115 to transmit multiple data blocks once the UE 115 won a transmission opportunity in the shared channel.

Further, in some aspects, instead of using a CG resource for a retransmission, the BS 105 can provide the UE 115 with a scheduled resource for a retransmission. In this regard, upon the BS 105 detecting a failure in decoding a data block from a CG transmission from the UE 115, the BS 105 may transmit a dynamic scheduling grant (e.g., PDCCH downlink control information (DCI)) to the UE 115. The dynamic scheduling grant may indicate a resource allocation and transmission parameters (e.g., MCS, SRI, and/or PMI) to be used for retransmitting the data block in the scheduled resource.

According to an aspect of the present disclosure, the UE 115 may utilize a scheduled resource for a retransmission of a data block previously transmitted in a CG resource for a different transmission. For instance, the UE 115 may transmit a transmission including a retransmission of the data block and/or an initial transmission or retransmission of another data block. Again, since the UE 115 is transmitting a different transmission in the scheduled resource than the scheduled transmission, the UE 115 may determine transmission parameters (e.g., MCS, SRI, and/or PMI) for the actual transmission and include the determined transmission parameters in CG-UCI transmitted along with the data block(s) in the scheduled resource. Mechanisms for dynamic indication of transmission parameters via CG-UCI are described in greater detail herein.

Figure 2:
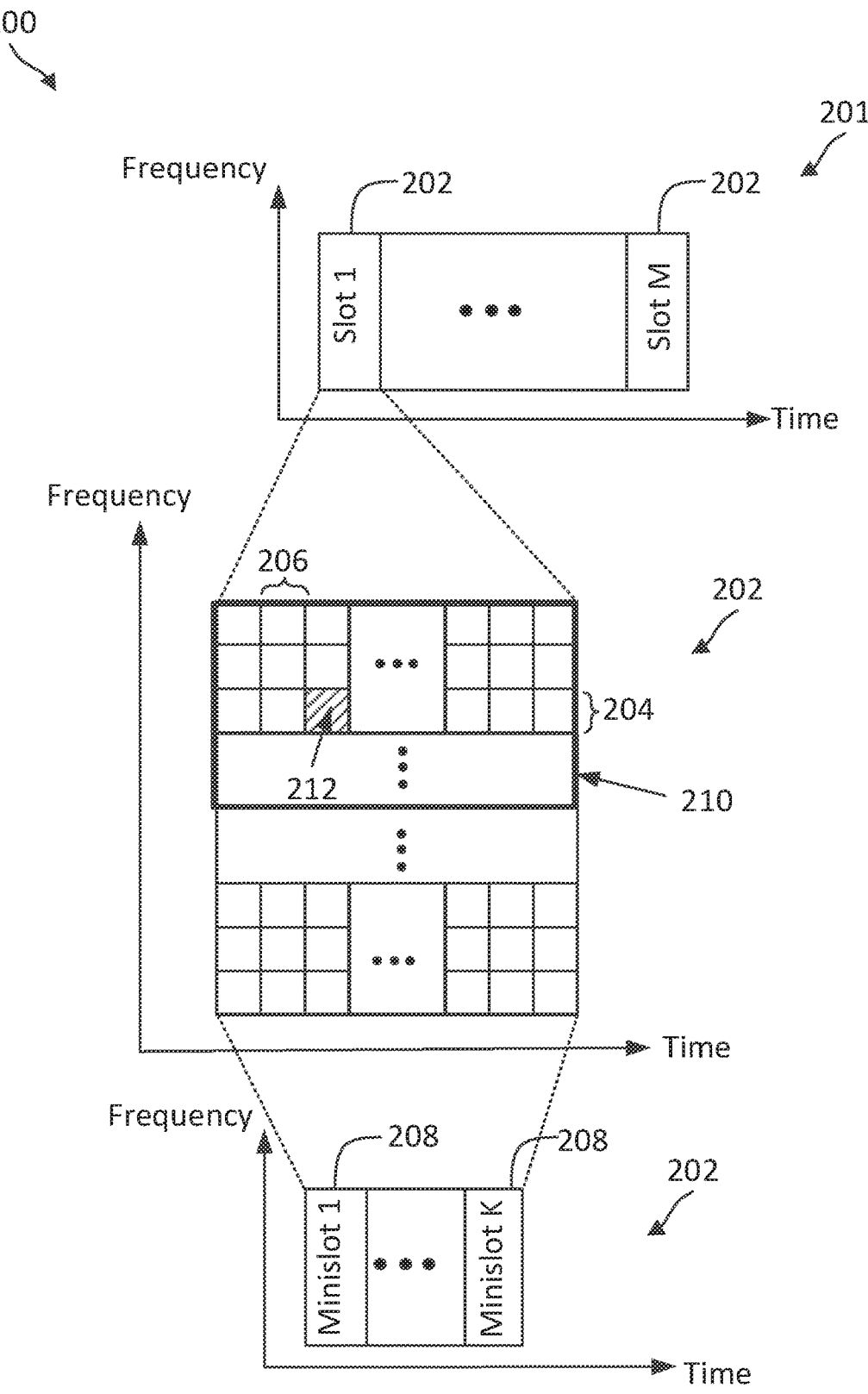
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and one or more consecutive symbols 206 in time. In NR, a RB 210 is defined as twelve consecutive subcarriers 204 in a frequency domain.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
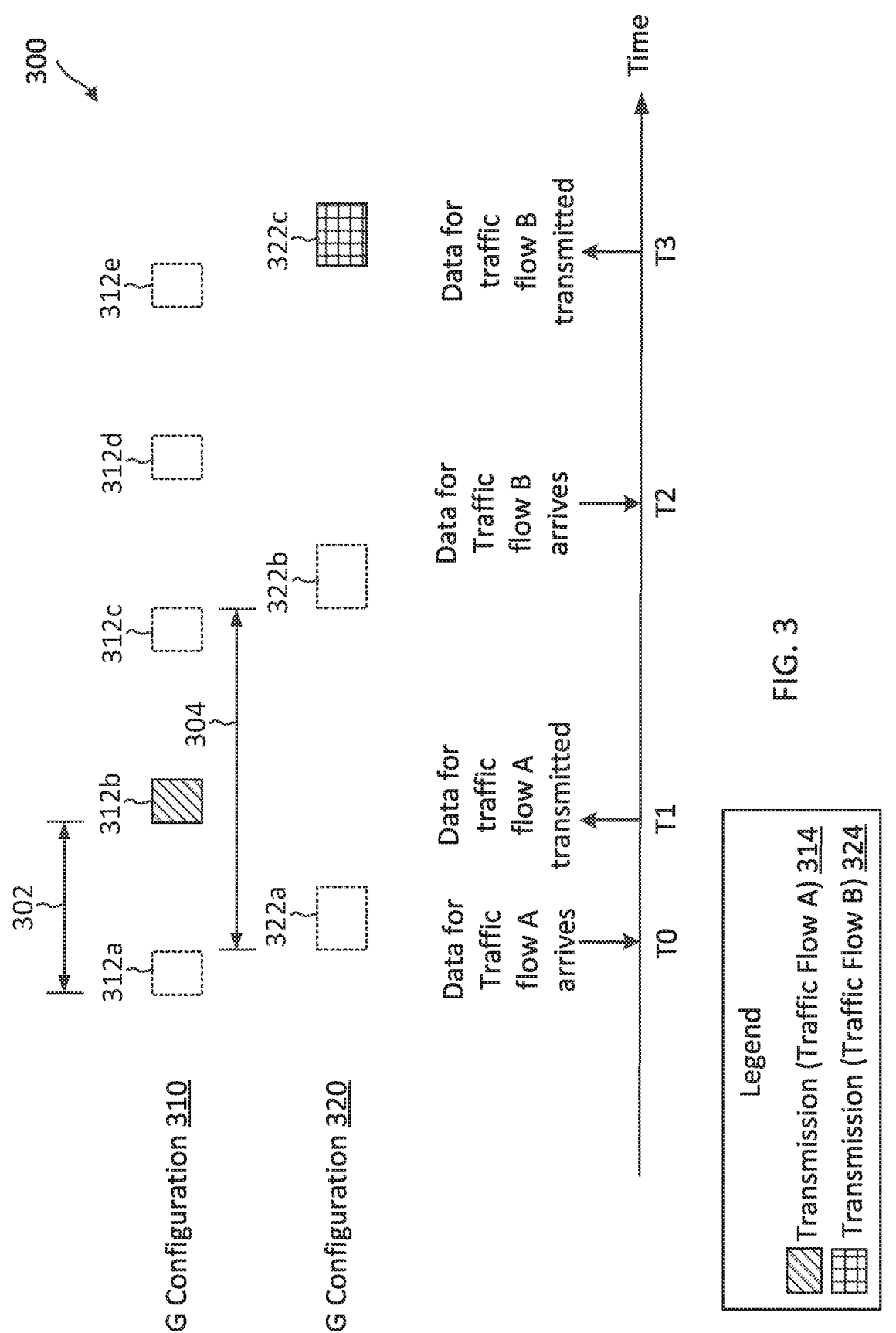
FIG. 3 illustrates a configured grant (CG)-based uplink (UL) transmission scenario according to one or more aspects of the present disclosure.

FIG. 3 illustrates a CG-based UL transmission scenario 300 according to one or more aspects of the present disclosure. The scenario 300 may correspond to an UL transmission scenario in the network 100 when utilizing CG resources. In FIG. 3, the x-axis represents time in some arbitrary units. In the scenario 300, a BS 105 may configure a UE 115 with multiple CG configurations, for example, a CG configuration 310 and a CG configuration 320. Although FIG. 3 illustrates two CG configurations, it should be understood that in other examples the BS may configure the UE with more than two CG configurations (e.g., about 3, 4, 5, 6 or more).

The CG configuration 310 may include a set of CG resources 312 (shown as 312a-312e with a repeating time interval 302) for the UE 115 to transmit an UL transmission (e.g., a CG-PUSCH transmission) without having to receive a specific scheduling grant from the BS 105 for each of the UL transmission. Similarly, the CG configuration 320 may include a set of CG resources 322 (shown as 322a-322c with a repeating time interval 304) for the UE 115 to transmit an UL transmission (e.g., a CG-PUSCH transmission) without having to receive a specific scheduling grant from the BS 105 for each of the UL transmission. The CG resources 312 and 322 are time-frequency resources, for example, each including one or more symbols (e.g., symbols 206) in time and one or more RBs (e.g., RBs 210) in as discussed above in relation to FIG. 2.

As discussed above, each CG configuration may be associated with a specific traffic flow. In the illustrated example of FIG. 3, the BS 105 may configure the CG configuration 310 for a traffic flow A and configure the CG configuration 320 for a traffic flow B. The traffic flow A and the traffic flow B may be associated with different MAC layer logical channels. The different traffic flows A and B can have different quality of service (QoS) requirements. For example, the traffic flow A may be an eMBB traffic, while the traffic flow B may be a URLLC traffic with a more stringent reliability and/or latency requirement than the traffic flow A.

The BS 105 may configure the CG configuration 310 and/or the CG configuration 320 via a semi-static configuration (e.g., an RRC configuration). In some aspects, the BS 105 may configure the UE 115 with the CG configuration 310 via CG type 1, for example, via a ConfiguredGrant-Config information element (IE). The CG configuration 310 may include various parameters related to the allocated resources 312 and transmission parameters to be used for transmission in the resources 312. For instance, the CG configuration 310 may include parameters, such as a time-DomainOffset parameter, a timeDomainAllocation parameter, a frequencyDomainAllocation parameter, a periodicity, precodingAndNumberOfLayers parameter, an srs-Re-sourceIndicator parameter, an mcsAndTBS parameter, and/ or a configured scheduling RNTI (CS-RNTI).

The timeDomainOffset parameter may indicate an offset of the resource 312 with respect to a system frame number (SFN) that identifies a certain radio frame (e.g., the radio frame 201). The timeDomainAllocation parameter may indicate a startSymbolAndLength (SLIV) for each CG resource 312. For example, the SLIV may indicate a starting symbol of a CG resource 312 within a certain slot (e.g., slot 202) and a duration (e.g., a number of OFDM symbols 206) of the CG resource 312. The frequencyDomainAllocation parameter may indicate a frequency domain allocation (e.g., a number of RBs 210 and/or the frequency locations or indices of the RBs 210) for the CG resource 312. The periodicity may indicate a repeating interval (e.g., a time period 302) for the CG resources 312.

The precodingAndNumberOfLayers parameter may indicate a transmission precoding matrix indicator (TPMI) and a transmission rank that the UE 115 may use to transmit in a CG resource 312. For instance, the UE 115 may generate a number of transmission streams according to the transmission rank and may perform precoding on each of the transmission stream according to a precoding matrix indicated by the TPMI. The srs-ResourceIndicator parameter may indicate an SRS resource in which the UE 115 may reference for transmitting in a CG resource 312. For instance, the SRS resource may be associated with certain antenna port configurations at the UE 115 and the UE 115 may utilize the same antenna port configuration as the SRS resource for transmitting in a CG resource 312. The mcsAndTBS parameter may indicate a MCS and a TBS that the UE 115 may use to transmit in a CG resource 312. For instance, the UE 115 may generate a data block (e.g., a TB) having the TBS and may modulate/encode the data block for transmission in a CG resource 312 based on the MCS. The CS-RNTI may be used by the UE 115 to monitor for a scheduling grant from the BS 105 for retransmitting a CG-PUSCH transmission.

In some other aspects, the BS 105 may configure the UE 115 with the CG configuration 310 via CG type 2. The BS 105 may configure a CG type 2 via an RRC configuration and an activation DCI. The RRC configuration may indicate a periodicity (e.g., the repeating time interval 302) of the CG resources 312. The BS 105 may activate, deactivate, and/or provide a scheduling grant for a retransmission via layer 1 signaling (e.g., DCI transmitted based on a CS-RNTI via a PDCCH). For instance, the BS 105 may provide additional parameters associated with the CG resources 312 by transmitting an activation DCI indicating an offset associated with the periodicity, a frequency domain resource allocation, and/or transmission parameters, such as MCS, SRI, precoding information including TPMI and transmission rank or a rank indicator (RI). The offset may indicate an offset of the resource 312 with respect to an SFN that identifies a certain radio frame (e.g., the radio frame 201). The frequency domain resource allocation may indicate a frequency domain allocation (e.g., a number of RBs 210 and/or the frequency locations or indices of the RBs 210) for the CG resource 312. The MCS, SRI, and/or the precoding information may be used by the UE 115 to generate a transmission for transmitting in the CG resource 312.

Similarly, the BS 105 may configure the UE 115 with the CG configuration 320 via a CG type 1 configuration or a type 2 configuration using similar mechanisms as discussed above. In some aspects, the CG configuration 310 may have one or more parameters (e.g., time domain offset, periodicity, frequency resource allocation, TBS, MCS, SRI, TPMI, and/or RI discussed above) different than the CG configuration 320 in addition to being configured for different traffic flows.

After the UE 115 is configured and/or activated with the CG configurations 310 and 320, the UE 115 may transmit data using the CG resources 312 and 322. However, the UE 115 may is expected to allowed to transmit data associated with the same specific traffic flow as configured by the CG configuration and using the same transmission parameters as configured by the CG configuration. In other words, the CG resources 312 may be used for transmitting data associated with traffic flow A, but not for traffic low B data. Similarly, the CG resources 322 may be used for transmitting data associated with traffic flow B, but not for traffic flow A data.

In the illustrated example, at time T0, data for traffic flow A arrives at the UE 115, for example, from an upper layer or an application at the UE 115. Although the CG resource 322a is closer to the traffic flow A data arrival time T0 than the CG resource 312b, the UE 115 may not transmit the data in the CG resource 322a since the CG resource 322a is configured for traffic flow B. Hence, the UE 115 may wait till time T1 to transmit the traffic flow A data (shown as transmission 314) in the CG resource 312b to the BS 105.

At time T2, data for traffic flow B arrives at the UE 115. Similarly, although the CG resources 312d and 312e are closer to the traffic flow data arrival time T2 than the CG resource 322c, the UE 115 may not transmit the data in the CG resources 312d or 312e since the CG resources 312d and 312e are configured for traffic flow A. Hence, the UE 115 may wait till time T3 to transmit the traffic flow B data (shown as transmission 324) in the CG resource 322c to the BS 105.

In some aspects, the UE 115 may generate the transmission 314 from the traffic flow A data based on the MCS, the SRI, and/or the precoding information provided by the CG configuration 310. Similarly, the UE 115 may generate the transmission 324 from the traffic flow B data based on the MCS, the SRI, and/or the precoding information provided by the CG configuration 320. Each CG-PUSCH transmission may further include CG-UCI carrying HARQ related information. For instance, the UE 115 may apply HARQ techniques to the transmission 314 and the transmission 324. Each of the transmission 314 and the transmission 324 may be associated with a different HARQ process. The transmission 314 may include CG-UCI indicating a HARQ process identified (ID), a redundancy version (RV), and/or a new data indicator (NDI) associated with the traffic flow A data. The transmission 324 may include CG-UCI indicating a HARQ process ID, a RV, and/or an NDI associated with the traffic flow B data.

In some aspects, for HARQ communications, a transmitting node (e.g., the UE 115) may transmit data (e.g., in the form of a TB) to a receiving node (e.g., the BS 105). The receiving node may provide the transmitting node with a feedback on the reception status of the data. For example, the receiving node may transmit an ACK to the transmitting node to indicate a successful decoding of the data. Conversely, the receiving node may transmit a NACK to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In some instances, the transmitting node may use the same encoding version for the initial transmission and the retransmission. In some other instances, the transmitting node may use different encoding versions for the initial transmission and the retransmission. The encoding versions may be referred to as RVs. Different RVs may include different combinations of systematic data information bits and error correction bit. In some aspects, the receiving node may perform soft-combining to decode the data based on the initial transmission and the retransmission.

In some aspects, the BS 105 may communicate with the UE 115 over a shared radio frequency band (e.g., in a shared spectrum or an unlicensed spectrum). To avoid collisions when communicating in a shared or an unlicensed spectrum, the UE 115 may perform LBT to contend for a COT in the shared channel. In an example, if channel is available (performance of the LBT results in a LBT pass and the UE 115 won the COT), the UE 115 may transmit an UL transmission (e.g., the CG transmission 314 or 324) during the COT. In some instances, the UL transmission may occupy a portion of the COT, and the UE 115 may share the remaining time of the COT with the BS 105. To indicate that the BS 105 may share a remaining time in the COT for UL and/or DL transmissions, the UE 115 may include COT sharing information (e.g., a remaining duration in the COT) in corresponding CG-UCI. If the channel is not available (performance of the LBT results in a LBT fail), the UE 115 may back off and perform the LBT procedure again at a later point in time. For instance, the UE 115 may perform an LBT prior to time T1 to contend for a COT. If the LBT is a pass, the UE 115 may transmit the traffic flow A transmission 314 in the CG resource 312b. Similarly, the UE 115 may perform an LBT prior to time T3 to contend for a COT. If the LBT is a pass, the UE 115 may transmit the traffic flow B transmission 324 in the CG resource 322c.

Figure 4:
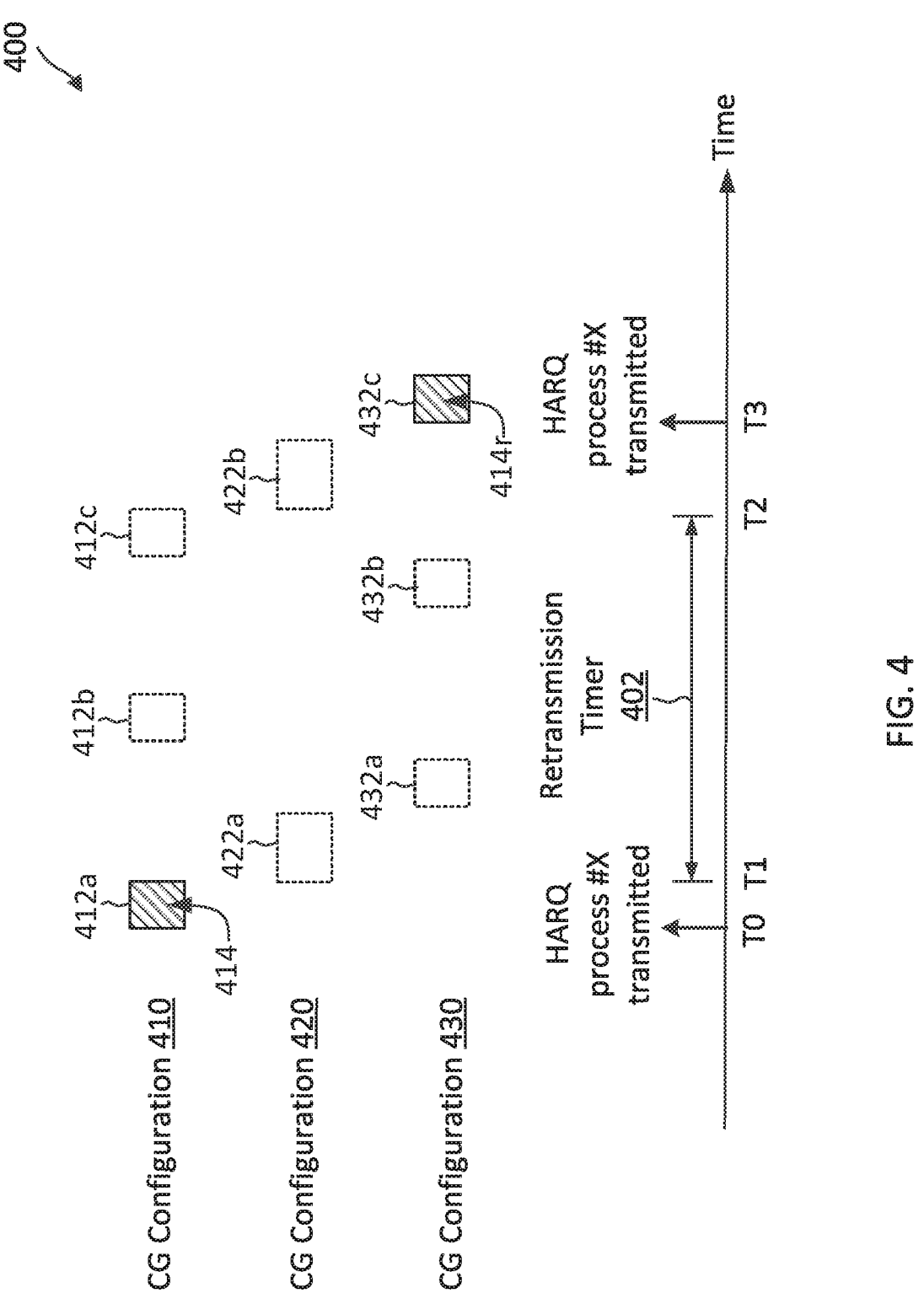
FIG. 4 illustrates a CG-based UL transmission scenario according to one or more aspects of the present disclosure.

FIG. 4 illustrates a CG-based UL transmission scenario 400 according to one or more aspects of the present disclosure. The scenario 400 may correspond to an UL transmission scenario in the network 100 when utilizing CG resources. In FIG. 4, the x-axis represents time in some arbitrary units. In the scenario 400, a BS 105 may configure a UE 115 with multiple CG configurations, for example, a CG configuration 410, a CG configuration 420, and a CG configuration 430. The CG configurations 410, 420, 430 may be substantially similar to the CG configurations 310 and 320. For instance, the BS 105 may configure the CG configurations 410, 420, 430 via CG type 1 or a CG type 2 configuration. Each of the CG configurations 410, 420, and 430 may include similar parameters as the CG configuration 310 and 320. However, in the scenario 400, the CG configurations 410, 420, and 430 may be associated with the same traffic flow (e.g., traffic flow A). The CG configurations 410, 420, and 430 can have one or more different parameters, such as offset parameters, frequency resource allocations, periodicities, TBSs, MCSs, SRIs, and/or precoding information. For instance, the CG configuration 410 and the CG configuration 430 have the same TBS parameter (e.g., a first TBS), but the CG configuration 420 has a different TBS parameter (e.g., a second TBS). Although FIG. 4 illustrates three CG configurations, it should be understood that in other examples the BS 105 may configure the UE 115 with any suitable number of CG configurations (e.g., about 1, 2, 4 or more) for a specific traffic flow.

As shown, the CG configuration 410 includes a set of CG resources 412 (shown as 412a-412c), the CG configuration 420 includes a set of CG resources 422 (shown as 422a-

422b), and the CG configuration 430 includes a set of CG resources 432 (shown as 432a-432c). In the scenario 400, the UE 115 may be allowed to transmit an initial transmission of a data block using a CG resource from a first CG configuration and transmit a retransmission of the data block using a CG resource from a second CG configuration (associated with the same data flow) provided the second CG configuration includes the same TBS parameter as the first CG configuration.

For instance, at time T0, the UE 115 may transmit a CG transmission 414 including an initial transmission of a data block (e.g., PUSCH data) associated with traffic flow A and a HARQ process #X using the CG resource 412a. The data block may have a size corresponding to the first TBS configured for the CG resource 412a. After transmitting, the CG transmission 414, the UE 115 may start a retransmission timer 402.

If the UE 115 does not receive any HARQ ACK/NACK feedback from the BS 105 before the retransmission timer 402 expires, for example, at time T2, the UE 115 may retransmit the data block to the BS 105. Although the CG resources 422b is a next available CG resource associated with the traffic flow A, the UE 115 may not retransmit the data block using the CG resource 422b since the CG resource 422b has a different TBS (the second TBS) than the CG resource 412a used for the initial transmission 414. A next available CG resource after the CG resource 422b is the CG resource 432c of the CG configuration 430. Since the CG resource 432c has the same TBS parameter (the first TBS) as the CG resource 412a used for the initial transmission 414, the UE 115 may retransmit the data block (shown as transmission 414r) to the BS 105 in the CG resource 432c.

Similar to the scenario 300, the UE 115 may include CG-UCI in each for the transmission 414 and 414r. The CG-UCI may include HARQ related information (e.g., HARQ process ID, RV, NDI) and/or COT sharing information. In instances, the CG-UCI in the transmission 414 may include an NDI value of 1 indicating the data block in the transmission 414 is an initial transmission, and the transmission 414r may include an NDI value of 0 indicating the data block in the transmission 414r is a retransmission.

As can be observed from the scenario 300, the CG transmissions may be inefficient as the UE 115 has to delay the transmission 314 (of traffic flow A) until a next CG resource (e.g., the CG resource 312b) for the traffic flow A instead of utilizing an earlier available CG resource (e.g., the CG resource 322a). Similarly, UE 115 has to delay the transmission 324 (of traffic flow B) until a next CG resource (e.g., the CG resource 322c) for the traffic flow B instead of utilizing an earlier available CG resource (e.g., the CG resource 312d). The retransmission scenario 400 is also inefficient since the UE 115 has to delay the retransmission 414r until a next CG resource (e.g., the CG resource 432c) of the same TBS instead of utilizing an earlier available CG resource (e.g., the CG resource 422b). Further, if the UE 115 is communicating with the BS 105 over a shared channel, the UE 115 may not gain access to the channel for transmitting data in a certain resource (associated with a traffic flow of the data or same TBS as CG resource used for an initial transmission of the data). Since transmission opportunity is not guaranteed, it may be desirable for a UE to determine what to transmit and how to transmit (e.g., what transmission parameters to use for the transmission) in a CG resource once the UE gains a transmission opportunity in the shared channel.

Accordingly, the present disclosure provides techniques for a UE to select a CG resource based on a traffic arrival time and/or a HARQ ACK/NACK result irrespective of a traffic flow or a TBS associated with the CG resource. The UE may dynamically determine transmission parameters for transmitting in the CG resource and indicate the determine transmission parameters in CG-UCI transmitted along with data in the CG resource.

Figure 5:
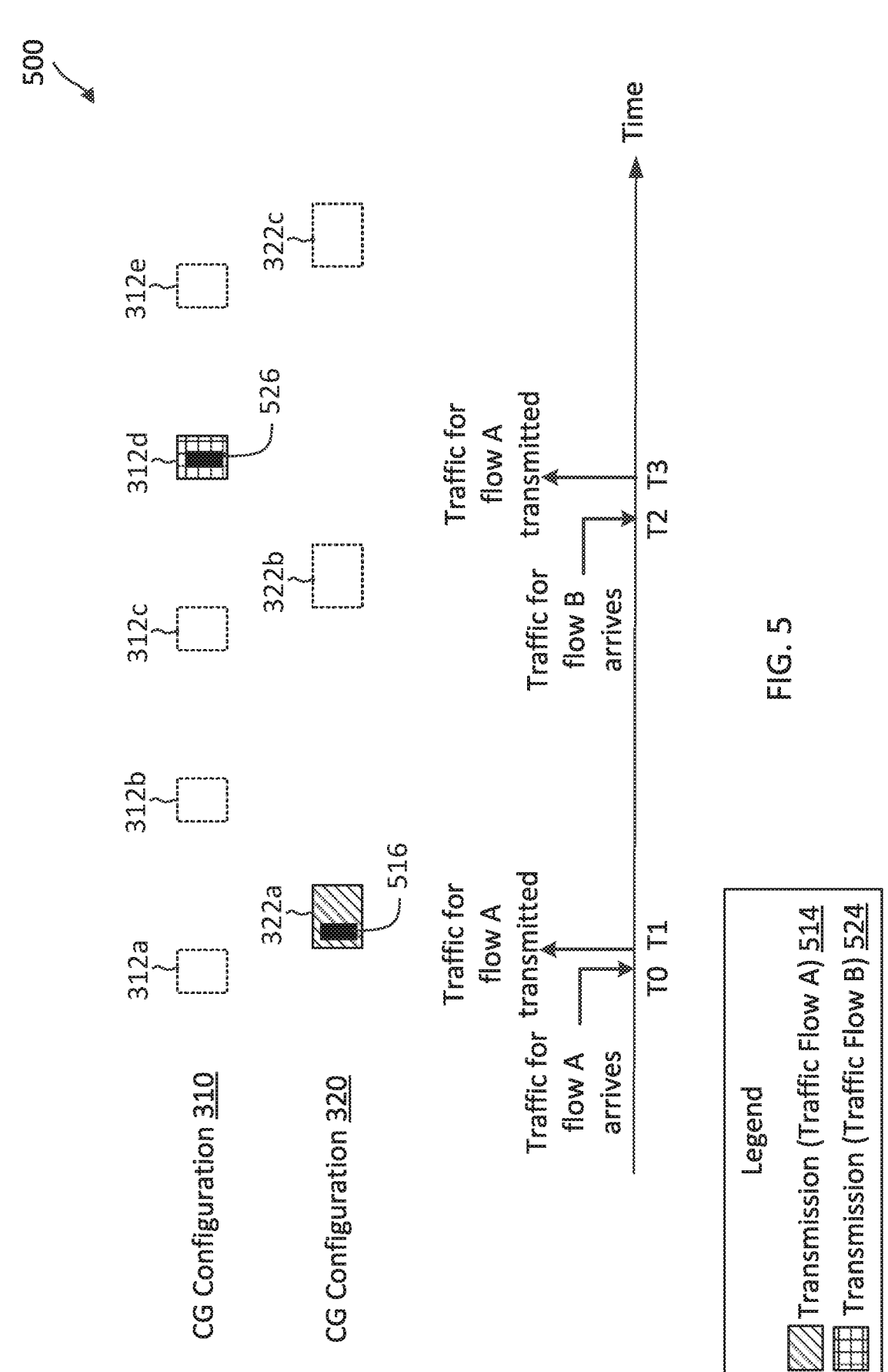
FIG. 5 illustrates a CG-based UL transmission scheme with dynamic transmission parameter indication according to one or more aspects of the present disclosure.

FIG. 5 illustrates a CG-based UL transmission scheme 500 with dynamic transmission parameter indication according to one or more aspects of the present disclosure. The scheme 500 may be employed by a UE such as the UE 115 and a BS such as the BS 105 for communications in a network such as the network 100. In FIG. 5, the x-axis represents time in some arbitrary units. The scheme 500 is described using the same CG configurations as in the scenario 300, and may use the same reference numerals as in FIG. 3 for simplicity's sake.

In the scheme 500, a BS 105 may configure a UE 115 with multiple CG configurations (e.g., the CG configurations 310 and 320) for different traffic flows. The UE 115 may dynamically determine which traffic flow to be transmitted in a CG resource. The UE 115 may dynamically determine transmission parameters for a transmission in a CG resource. The determined transmission parameters can be different than transmission parameters configured for the CG resource. The UE 115 may report the determined transmission parameters to the BS 105 using CG-UCI. For instance, upon detecting data arrival for a certain traffic flow, the UE 115 may select a CG resource (e.g., an earliest available CG resource) from any of the CG configurations for transmitting the data. The CG resource selection may be independent from a traffic flow associated with the CG resource. The UE 115 may determine one or more transmission parameters (e.g., MCS, SRI, precoding information) for transmitting the data in the selected CG resource and indicate the determine transmission parameter(s) in CG-UCI transmitted along with the data in the selected CG resource.

In the illustrated example of FIG. 5, at time T0, data for traffic flow A arrives at the UE 115, for example, from an upper layer or an application at the UE 115. The UE 115 may select a resource from the resources 312 (configured by the CG configuration 310) or the resources 322 (configured by the CG configuration 320) based on the arrival time T0. Although the CG resource 322a is associated with traffic flow B, the CG resource 322a is an earliest available CG resource after time T0. Thus, the UE 115 may select the CG resource 322a. The UE 115 may dynamically determine transmission parameter(s) (e.g., MCS, SRI, and/or precoding information including TPMI and/or RI) for transmitting the traffic flow A data in the CG resource 322a. The UE 115 may generate a data block (a TB) from the traffic flow A data and generate a transmission 514 from the data block. The transmission parameter(s) may be different from the transmission parameter(s) configured by the CG configuration 320. In some aspects, the UE 115 may determine transmission parameter(s) (e.g., a MCS) based on a size or TBS of the data block and a size (e.g., number of REs 212) of the CG resource 322a. In some aspects, the UE 115 may determine transmission parameter(s) (e.g., SRI and/or precoding information including TPMI and/or RI) based on a channel condition between the UE 115 and the BS 105. At time T1, the UE 115 may transmit the CG transmission 514 including the data block and CG-UCI 516 to the BS 105 in the selected CG resource 322a. To facilitate reception and/or decoding of the transmission 514, the UE 115 may include the determined transmission parameter(s) in the CG-UCI 516.

At time T2, data for traffic flow B arrives at the UE 115. Similarly, the UE 115 may select the CG resource 312d based on the CG resource 312d being a next earliest available CG resource after the arrival time T2. The UE 115 may dynamically determine transmission parameter(s) (e.g., MCS, SRI, and/or precoding information including TPMI and/or RI) for transmitting the traffic flow B data in the CG resource 312d. The transmission parameter(s) may be different from the transmission parameter(s) configured by the CG configuration 310. The UE 115 may generate a transmission 524 from the traffic flow B data based on the determined transmission parameters. At time T3, the UE 115 may transmit the CG transmission 524 including the traffic flow B data and CG-UCI 526 to the BS 105 in the selected CG resource 312d. To facilitate reception and/or decoding of the transmission 524, the UE 115 may include the determined transmission parameter(s) in the CG-UCI 526.

In some aspects, the UE 115 may include one or more parameters, such as a HARQ process ID, NDI, RV, COT sharing information, SRI, and/or precoding information and number of layers (e.g., TPMI and RI) in the CG-UCI 516 and 526. In some aspects, the UE 115 may determine the number of encoded bits for CG-UCI based on the MCS configured for the corresponding CG resource. For instance, the UE 115 may determine the number of encoded bits for the CG-UCI 516 transmitted in the CG resource 322a using the MCS in the CG configuration 320, and may determine the number of encoded bits for the CG-UCI 526 transmitted in the CG resource 312d using the MCS in the CG configuration 310.

Figure 6:
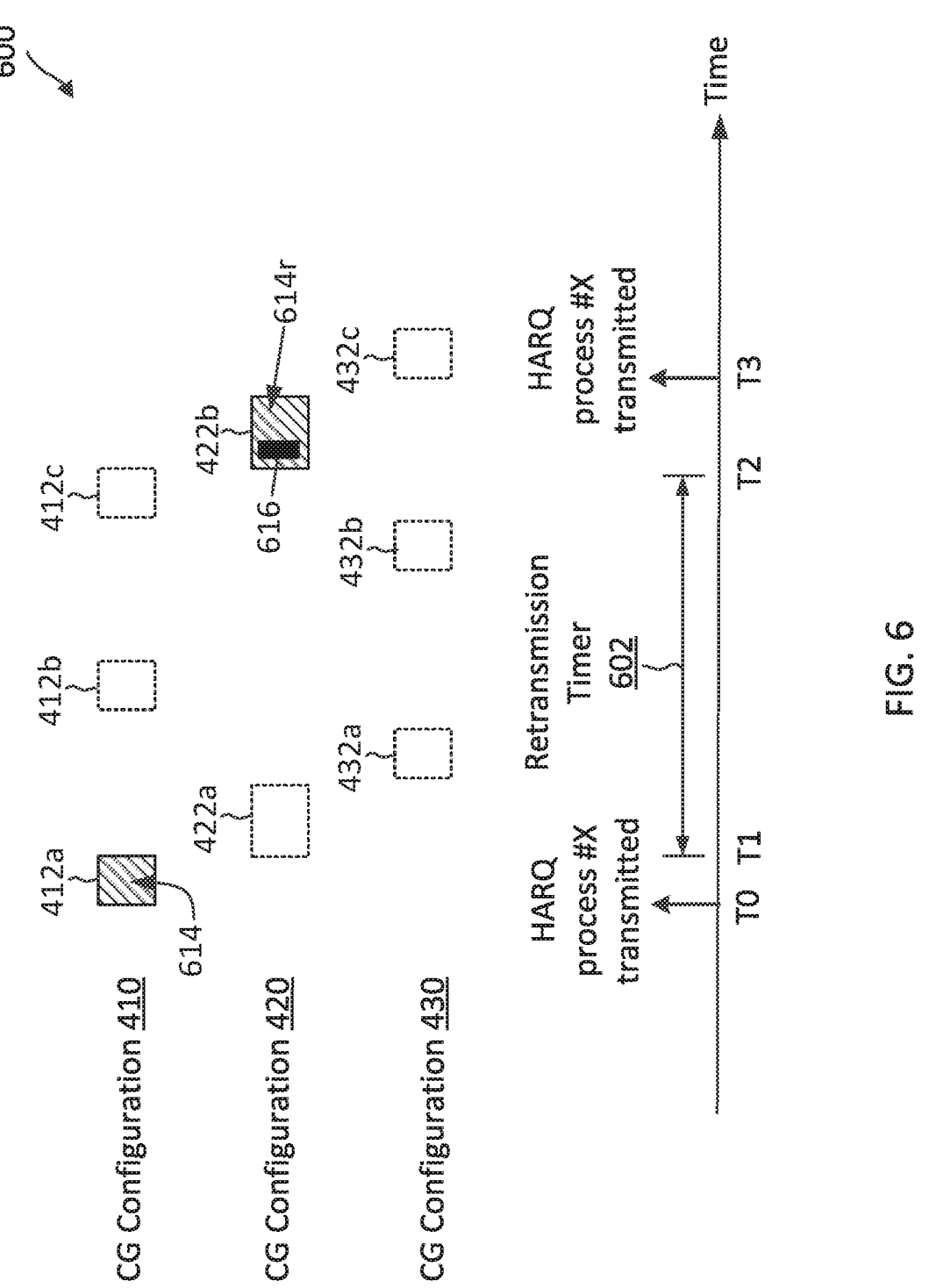
FIG. 6 illustrates a CG-based UL transmission scheme with dynamic transmission parameter indication according to one or more aspects of the present disclosure.

FIG. 6 illustrates a CG-based UL transmission scheme 600 with dynamic transmission parameter indication according to one or more aspects of the present disclosure. The scheme 600 may be employed by a UE such as the UE 115 and a BS such as the BS 105 for communications in a network such as the network 100. In FIG. 6, the x-axis represents time in some arbitrary units. The scheme 600 is described using the same CG configurations as in the scenario 400, and may use the same reference numerals as in FIG. 4 for simplicity's sake.

In the scheme 600, a BS 105 may configure a UE 115 with multiple CG configurations (e.g., the CG configurations 310 and 320) for one or more traffic flows. The UE 115 may apply HARQ technique for CG transmissions and may perform autonomous retransmission. The UE 115 may perform retransmission in a CG resource that is configured with for a different TSB than the retransmission. The UE 115 may utilize transmission parameters that are different than the transmission parameters configured for the CG resource and report the transmission parameters to the BS 105 via CG-UCI. For instance, the UE 115 may transmit a data block (e.g., a TB) associated with a HARQ process #X in a first CG resource. The UE 115 may retransmit the data block, for example, based on an HARQ ACK/NACK result. In some instances, the UE 115 may obtain a HARQ ACK/NACK result associated with the transmission of the data block based on a downlink feedback indication (DFI), which may be an ACK or NACK, provided by the BS 105. In some instances, the UE 115 may start a retransmission timer after transmitting a data block. If the UE 115 fails to receive an ACK from the BS 105 for the data block or upon an expiry of the retransmission timer, the UE 115 may retransmit the data block. For the retransmission, the UE 115 may select a CG resource (e.g., an earliest available CG resource) from any of the CG configurations. The CG resource selection may be independent from a TBS associated with the CG resource. The UE 115 may determine one or more transmission parameters (e.g., MCS, SRI, and/or precoding information including TPMI and/or RI) for retransmitting the data block in the selected CG resource and indicate the determine transmission parameter(s) in CG-UCI transmitted along with the data in the selected CG resource.

In the illustrated example of FIG. 6, the UE 115 may transmit a CG transmission 614 including a data block (e.g., PUSCH data) associated with traffic flow A and HARQ process #X using the CG resource 412a. The CG transmission 614 may include CG-UCI indicating at least HARQ information (e.g., HARQ process ID, RV, NDI) to the data block. After transmitting, the CG transmission 614, the UE 115 may start a retransmission timer 602. The UE 115 may monitor for a HARQ ACK/NACK feedback (e.g., in a DFI) from the BS 105. If the UE 115 does not receive any HARQ ACK/NACK feedback from the BS 105 before the retransmission timer 602 expires, for example, at time T2, the UE 115 may retransmit the data block to the BS 105.

The UE 115 may select the CG resource 422b based on the CG resource 422b being a next earliest available CG resource after the retransmission timer expires at time T2 irrespective of a TBS of the CG resource 422b. The UE 115 may dynamically determine transmission parameter(s) (e.g., MCS, SRI, and/or precoding information including TPMI and/or RI) for retransmitting the data block in the CG resource 422b. The transmission parameter(s) may be different from the transmission parameter(s) configured by the CG configuration 420. Similar to the scheme 500, the UE 115 may determine a MCS based on a size or TBS of the data block and a size (e.g., number of REs 212) of the CG resource 422b. Additionally or alternatively, the UE 115 may determine SRI, TPMI, and/or RI based on a channel condition between the UE 115 and the BS 105. The UE 115 may generate a transmission 614r from the traffic flow B data based on the determined transmission parameters. At time T3, the UE 115 may transmit a transmission 614r including a retransmission of the data block and CG-UCI 616 to the BS 105 in the selected CG resource 422b. To facilitate reception and/or decoding of the transmission 614r, the UE 115 may include the determined transmission parameter(s) in the CG-UCI 616.

In some aspects, the UE 115 may include one or more parameters, such as a HARQ process ID, NDI, RV, COT sharing information, SRI, and/or precoding information and number of layers (e.g., TPMI and RI) in the CG-UCI 616. In some aspects, the UE 115 may determine the number of encoded bits for the CG-UCI 616 based on the MCS in the CG configuration 420.

Figure 7:
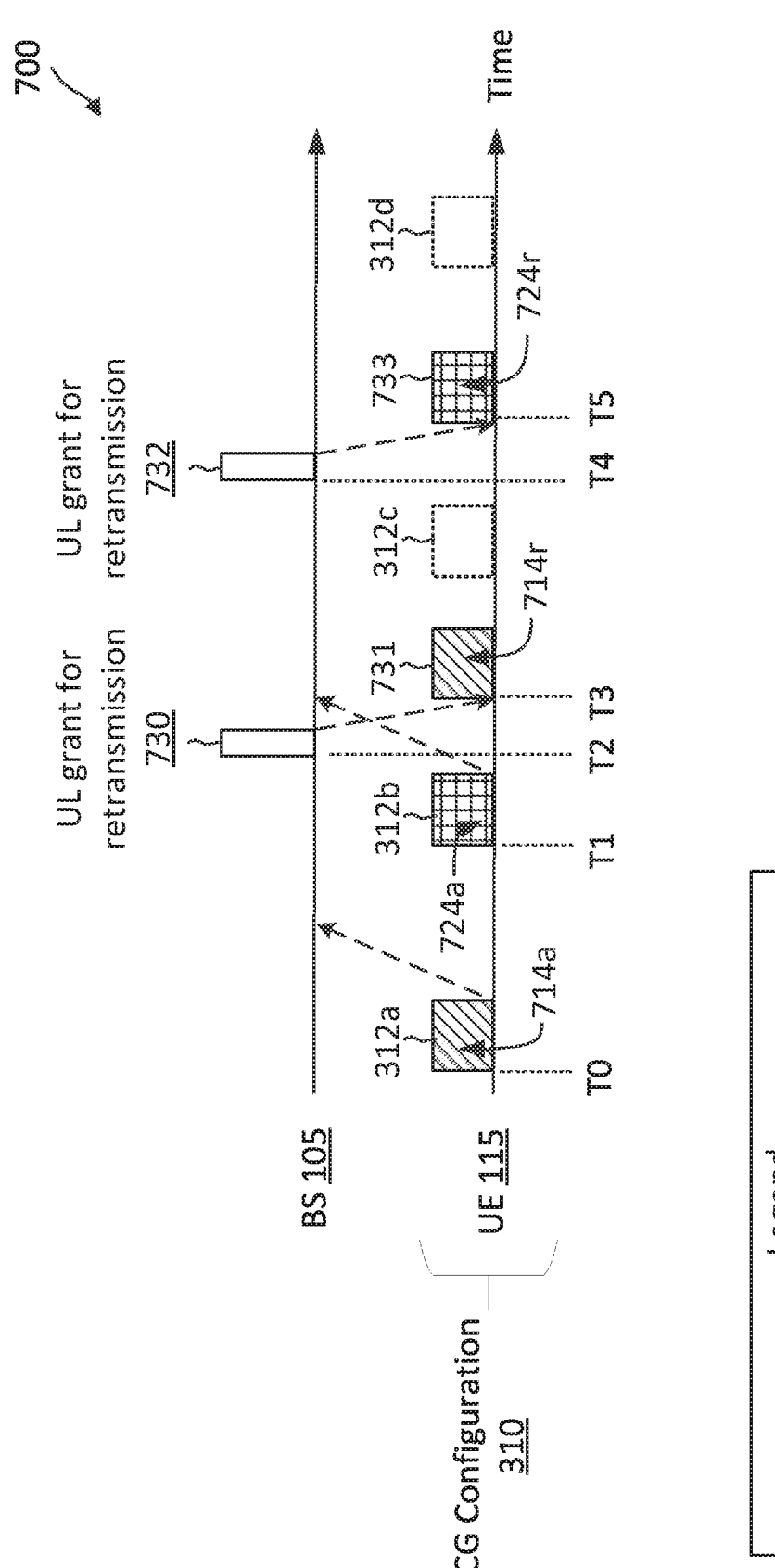
FIG. 7 illustrates a scheduling-based UL retransmission scenario according to one or more aspects of the present disclosure.
Figure 8:
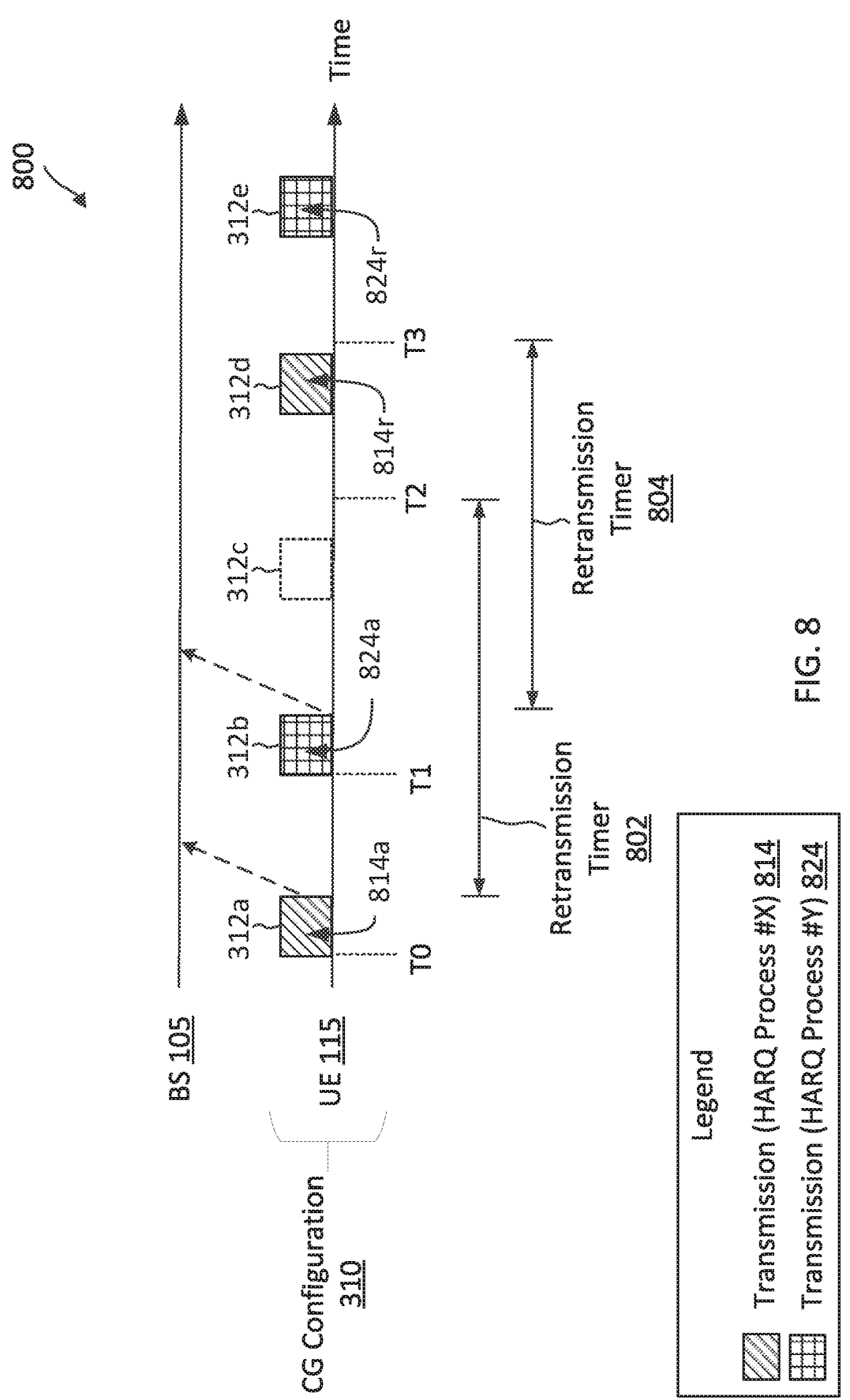
FIG. 8 illustrates a CG-based UL retransmission scenario according to one or more aspects of the present disclosure.
Figure 9:
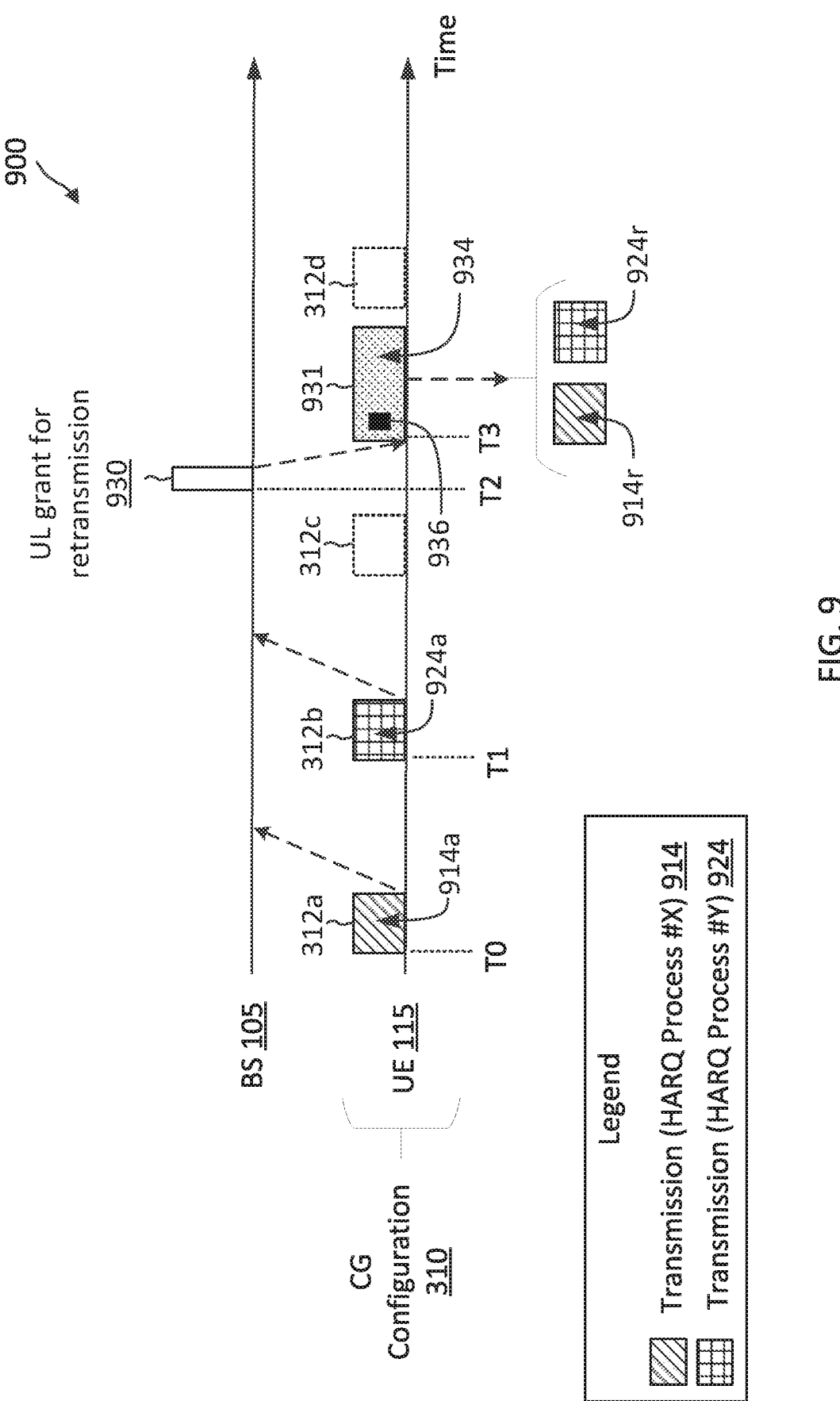
FIG. 9 illustrates a scheduling-based UL retransmission scheme with dynamic transmission parameter indication according to one or more aspects of the present disclosure.
Figure 10:
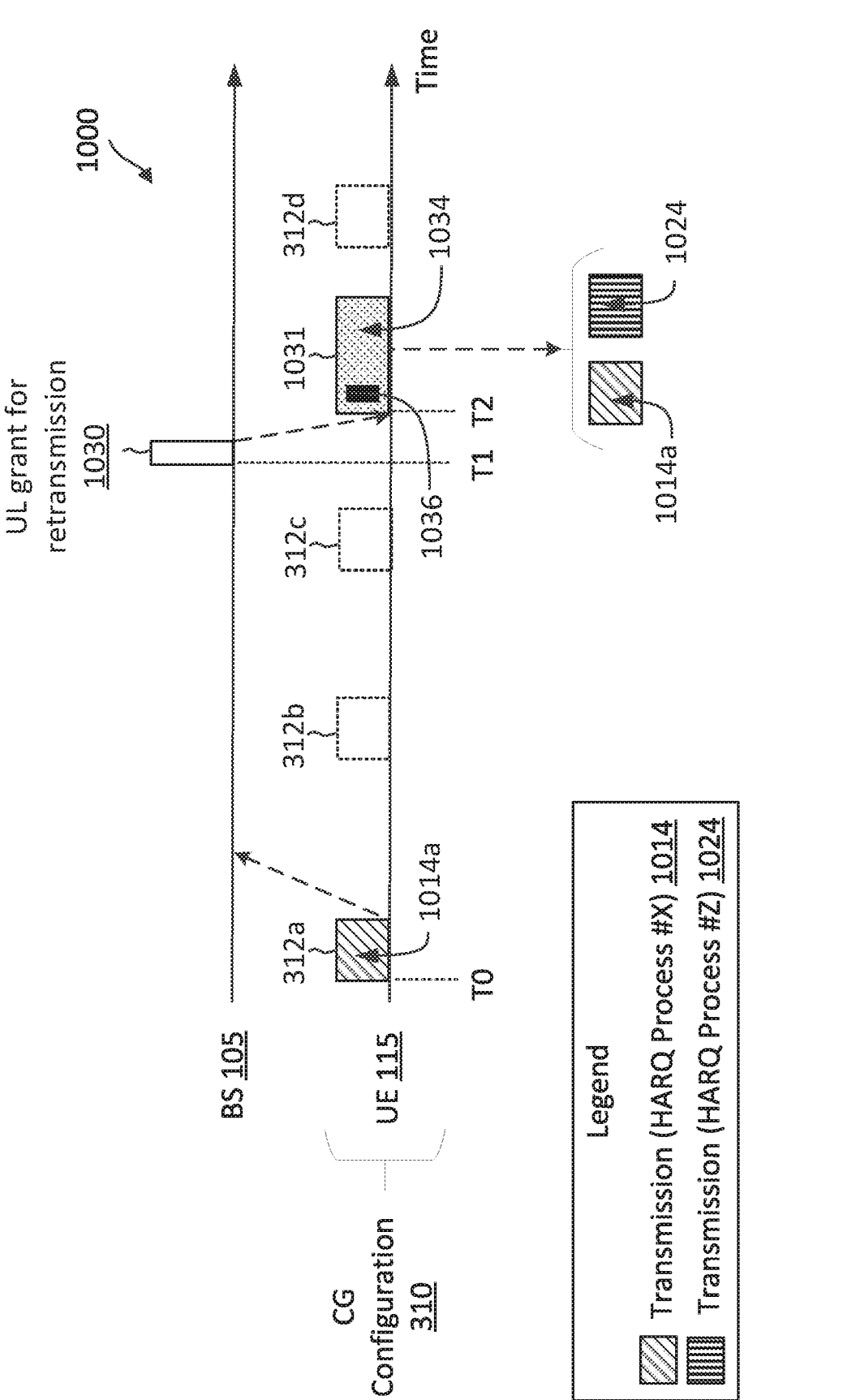
FIG. 10 illustrates a scheduling-based UL retransmission scheme with dynamic transmission parameter indication according to one or more aspects of the present disclosure.
Figure 11:
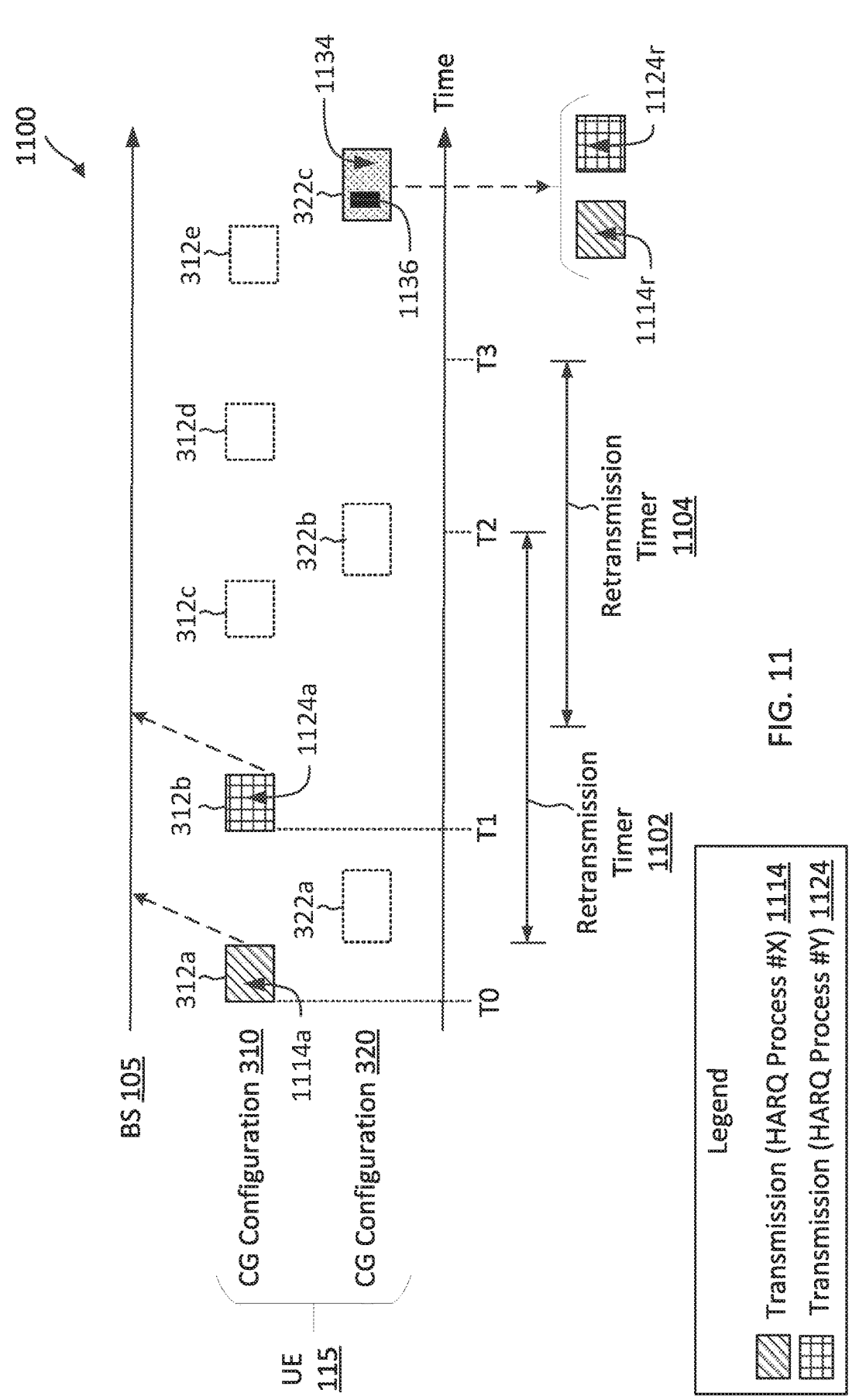
FIG. 11 illustrates a CG-based UL retransmission scheme with dynamic transmission parameter indication according to one or more aspects of the present disclosure.

As discussed above, the BS 105 and the UE 115 may HARQ techniques to CG UL transmissions. In some aspects, the BS 105 may provide the UE 115 with a dynamic scheduling grant for retransmitting a CG transmissions in a scheduled resource and the UE 115 may transmit a retransmission of a CG transmission in a scheduled resource in accordance with the dynamic scheduling grant. In some other aspects, the BS 105 may provide the UE 115 with a DFI to indicate a HARQ ACK/NACK for a CG transmission and the UE 115 may transmit a retransmission of a CG transmission in a CG resource. FIG. 7 illustrates a current scheduling-based retransmission scenario and FIG. 9 illustrates improvements/enhancements for scheduling-based retransmission. FIG. 8 illustrates a current CG-based retransmission scenario and FIGS. 10-11 illustrate improvements/enhancements for CG-based retransmission.

FIG. 7 illustrates a scheduling-based UL retransmission scenario 700 according to one or more aspects of the present disclosure. The scenario 700 may correspond to an UL transmission scenario in the network 100 when utilizing CG resources. In FIG. 7, the x-axis represents time in some arbitrary units. In the scenario 700, a BS 105 may configure a UE 115 with one or more CG configurations for UL transmission and may be provide the UE 115 with a dynamic scheduling grant for retransmitting a CG transmission. The scenario 700 is described using the same CG configuration 310 as in the scenario 300, and may use the same reference numerals as in FIG. 3 for simplicity's sake.

In the scenario 700, the UE 115 may implement multiple parallel HARQ processes (e.g., a HARQ process #X and a HARQ process #Y) for the traffic flow A. Each HARQ process may be identified by a HARQ process ID (e.g., an ID X and an ID Y). The HARQ processes may operate independent of each other. In other words, ACKs, NACKs, and/or retransmissions are determined and processed separately for each HARQ process at the UE 115.

At time T0, the UE 115 transmits a CG transmission 714a in the CG resource 312a to the BS 105. The CG transmission 714a may include a first data block or a TB associated with a HARQ process #X for traffic flow A.

At time T1, the UE 115 transmits a CG transmission 724a in the CG resource 312b to the BS 105. The CG transmission 724a may include a second data block or a TB associated with a HARQ process #Y for traffic flow A. The HARQ process #Y may be a different separate HARQ process than the HARQ process #X.

The BS 105 may fail to decode the first data block from the CG transmission 714a. Accordingly, the BS 105 may transmit a scheduling grant 730 (e.g., PDCCH DCI) to the UE 115 at time T2. The scheduling grant 730 may indicate a scheduled resource 731 at time T3 for the UE 115 to retransmit the first data block. Upon receiving the scheduling grant 730, the UE 115 may retransmit the first data block of the HARQ process #X (shown as a retransmission 714r) in the scheduled resource 731.

Similarly, the BS 105 may fail to decode the second data block from the CG transmission 724a. Accordingly, the BS 105 may transmit a scheduling grant 732 (e.g., PDCCH DCI) to the UE 115 at time T4. The scheduling grant 732 may indicate a scheduled resource 733 at time T5 for the UE 115 to retransmit the second data block. Upon receiving the scheduling grant 732, the UE 115 may retransmit the second data block of the HARQ process #Y (shown as a retransmission 724r) in the scheduled resource 733.

While the BS 105 can provide the UE 115 with a scheduled resource for retransmitting a CG transmission, the dynamic scheduling mechanism can be limiting. For instance, each scheduling grant 730 or 732 may schedule a retransmission of a single TB/HARQ process, but not for multiple TBs or multiple HARQ processes. As can be observed from the scenario 700, the BS 105 transmit multiple scheduling grants (e.g., the scheduling grants 730 and 732) to schedule retransmission of multiple TBs/HARQ processes.

As discussed above, in some instances, the BS 105 and the UE 115 may communicate with each other over a shared radio frequency band (e.g., in a shared spectrum or an unlicensed spectrum), and may perform LBTs to contend for transmission opportunities in the shared channel. For instance, in the scenario 700, the BS 105 may perform an LBT to contend for a transmission opportunity for transmission of each scheduling grant 730 and 732. Similarly, the UE 115 may perform an LBT to contend for a transmission opportunity for transmission of each CG transmission 714a, 724a, 714r, and 724r. Each LBT is associated with an overhead and channel access uncertainty. As such, it may be desirable for the BS 105 to grant multiple transmission/ retransmission(s) in a scheduled resource once the BS 105 won a transmission opportunity in the shared channel, and for the UE 115 to transmit multiple data blocks once the UE 115 won a transmission opportunity in the shared channel so that LBT overhead can be reduced.

FIG. 8 illustrates a CG-based UL retransmission scenario 800 according to one or more aspects of the present disclosure. The scenario 800 may correspond to an UL transmission scenario in the network 100 when utilizing CG resources. In FIG. 8, the x-axis represents time in some arbitrary units. In the scenario 800, a BS 105 may configure a UE 115 with one or more CG configurations for UL transmission and the UE may perform autonomous retransmissions based on HARQ ACK/NACK results associated with CG transmission. The scenario 800 is described using the same CG configuration 310 as in the scenario 300, and may use the same reference numerals as in FIG. 3 for simplicity's sake.

In the scenario 800, the UE 115 may implement multiple parallel HARQ processes (e.g., a HARQ process #X and a HARQ process #Y) for the traffic flow A. Each HARQ process may be identified by a HARQ process ID (e.g., an ID X and an ID Y). The HARQ processes may operate independent of each other. In other words, ACKs, NACKs, and/or retransmissions are determined and processed separately for each HARQ process at the UE 115.

At time T0, the UE 115 transmits a CG transmission 814*a* in the CG resource 312*a* to the BS 105. The CG transmission 814*a* may include a first data block or a TB associated with a HARQ process #X for traffic flow A. After transmitting the CG transmission 814*a*, the UE 115 may start a retransmission timer 802 for the HARQ process #X. The UE 115 may also monitor for a DFI (e.g., a HARQ ACK/NACK feedback) for the first data block from the BS 105.

At time T1, the UE 115 transmits a CG transmission 824*a* in the CG resource 312*b* to the BS 105. The CG transmission 824*a* may include a second data block or a TB associated with a HARQ process #Y for traffic flow A. The HARQ process #Y may be a different separate HARQ process than the HARQ process #X. Similarly, after transmitting the CG transmission 824*a*, the UE 115 may start a retransmission timer 804 for the HARQ process #Y. The UE 115 may also monitor for a DFI (e.g., a HARQ ACK/NACK feedback) for the second data block from the BS 105.

At time T2, the retransmission timer 802 for the HARQ process #X expires. If the UE 115 has not received any DFI for the first data block from the BS 105 and the retransmission timer 802 expires, the UE 115 may retransmit the first data block in a next available CG resource. As shown, the UE 115 retransmit the first data block (shown as a retransmission 814*r*) in the CG resource 312*d*.

At time T3, the retransmission timer 804 for the HARQ process #Y expires. Similarly, if the UE 115 has not received any DFI for the second data block from the BS 105 and the retransmission timer 804 expires, the UE 115 may retransmit the second data block in a next available CG resource. As shown, the UE 115 retransmit the second data block (shown as a retransmission 824*r*) in the CG resource 312*e*.

While the UE 115 may perform retransmission of CG transmissions using a CG resource, the UE 115 may be limited to transmitting a single TB or data related to a single HARQ process in a CG resource. If the CG resources are in a shared radio frequency band, the UE 115 may perform an LBT for each retransmission. As discussed above, each LBT is associated with an overhead and channel access uncertainty. As such, it may be desirable for the UE 115 to transmit multiple data blocks once the UE 115 won a transmission opportunity in the shared channel.

FIG. 9 illustrates a scheduling-based UL retransmission scheme 900 with dynamic transmission parameter indication according to one or more aspects of the present disclosure. The scheme 900 may be employed by a UE such as the UE 115 and a BS such as the BS 105 for communications in a network such as the network 100. In FIG. 9, the x-axis represents time in some arbitrary units. The scheme 900 is described using the same CG configuration 310 as in the scenario 300, and may use the same reference numerals as in FIG. 3 for simplicity's sake. The scheme 900 illustrate improvements and/or enhancements to the scheduling-based retransmission scenario 700 discussed above in relation to FIG. 7.

In the scheme 900, a BS 105 may configure a UE 115 with one or more CG configurations each including a set of CG resources. The BS 105 may provide the UE 115 with a dynamic scheduling grant for transmission and/or retransmission of one or more data blocks or TBs associated with CG transmissions in a scheduled resource. The scheduling grant may indicate the number of data blocks or TBs that can be transmitted in the scheduled resource and transmission parameters (e.g., MCS, SRI, and/or precoding information including TPMI and/or RI) to be used for the transmission. The UE 115 may determine to a number of transmission/ retransmissions to be transmitted in the scheduled resource and/or transmission parameter(s) to be used for the transmission in the scheduled resource. The UE 115 may report information associated with the transmission in the scheduled resource via CG-UCI. For instance, the UE 115 may include CG-UCI in the transmission, where the CG-UCI may indicate a number of TBs in the transmission and/or the transmission parameters used for the transmission.

In the illustrated example of FIG. 9, at time T0, the UE 115 transmits a CG transmission 914*a* in the CG resource 312*a* to the BS 105. The CG transmission 914*a* may include a first data block or a TB associated with a HARQ process #X for traffic flow A.

At time T1, the UE 115 transmits a CG transmission 924*a* in the CG resource 312*b* to the BS 105. The CG transmission 924*a* may include a second data block or a TB associated with a HARQ process #Y for traffic flow A. The HARQ process #Y may be a different separate HARQ process than the HARQ process #X.

The BS 105 may fail to decode the first data block from the CG transmission 914*a*. The BS 105 may also fail to decode the second data block from the CG transmission 924*a*. The BS 105 may schedule a single resource for the UE 115 to retransmit both the first data block of HARQ process #X and the second data block of HARQ process #Y. As shown, at the time T2, the BS 105 may transmit a scheduling grant 930 (e.g., PDCCH DCI) to the UE 115. The scheduling grant 930 may indicate a scheduled resource 931 at time T3 for the UE 115 to retransmit the first data block and the second data block. The scheduling grant 930 may also indicate a number of TBs scheduled for the scheduled resource 931. In some instances, the scheduling grant 930 may indicate the HARQ process IDs (e.g., HARQ process ID #X and HARQ process ID #Y). In some instances, the scheduling grant 930 may include a HARQ process ID field and the HARQ process ID field may indicate both HARQ ID #X and HARQ process ID #Y. The UE 115 may determine the number of TBs based on the number of HARQ process IDs included in the HARQ process ID field. The scheduling grant 930 may also indicate transmission parameters, such as MCS, SRI, and/or precoding information including TPMI and/or RI. Although FIG. 9 illustrates the scheduling grant 930 providing a scheduled resource 931 for two data blocks/TBs/HARQ processes, it should be understood that in other examples the BS 105 may schedule any suitable number of data blocks/TBs/HARQ processes (e.g., about 3, 4, or more) in a single scheduled resource.

Upon receiving the scheduling grant 930, the UE 115 transmit a transmission 934 including a retransmission of the first data block of the HARQ process #X (shown as retransmission 914r) and a retransmission of the second data block of the HARQ process #Y (shown as retransmission 924r) in the scheduled resource 931. In some aspects, the UE 115 may transmit the transmission 934 using the transmission parameters provided by the scheduling grant 930. In some aspects, the UE 115 may determine transmission parameter(s) (e.g., MCS, SRI, and/or precoding information including TPMI and/or RI) that are different than the transmission parameter(s) provided by the scheduling grant 930 and may transmit CG-UCI 936 along with the transmission 934, where the CG-UCI 936 may indicate the actual transmission parameters (the determined transmission parameters) used for the transmission 934.

In some aspects, the UE 115 may utilize the same transmission parameters (e.g., MCS, SRI, precoding parameters) for the multiple data blocks or TBs included in the scheduled transmission 934. For instance, the CG-UCI 936 may include an HARQ process ID, an NDI, and an RV for each of the first data block and second data block, COT sharing information, and the same MCS, SRI, and precoding information for both the first data block and the second data block. In general, the UE 115 may include one or more of the parameters in the CG-UCI 936.

In some aspects, the UE 115 may utilize separate transmission parameters for the multiple data blocks or TBs included in the scheduled transmission 934. For instance, the CG-UCI 936 may include an HARQ process ID, an NDI, an RV, and an MCS for each of the first data block and second data block, COT sharing information, and the same SRI and precoding information for both the first data block and the second data block. In general, the UE 115 may include one or more of the parameters in the CG-UCI 936. In some aspects, the UE 115 can also include separate SRI and/or precoding information for the first data block and the second data block.

In some aspects, the UE 115 may determine a number of encoded bits for the CG-UCI 936 based on the MCS indicated by the scheduling grant 930. In some aspects, the UE 115 may encode the CG-UCI 936 using the indicated MCS, while encoding the first data block and second data block using a different MCS than the indicated MCS. Additionally, the UE 115 may encode the first data block and the second data block using different MCSs.

FIG. 10 illustrates a scheduling-based UL retransmission scheme 1000 with dynamic transmission parameter indication according to one or more aspects of the present disclosure. The scheme 1000 may be employed by a UE such as the UE 115 and a BS such as the BS 105 for communications in a network such as the network 100. In FIG. 10, the x-axis represents time in some arbitrary units. The scheme 1000 is described using the same CG configuration 310 as in the scenario 300, and may use the same reference numerals as in FIG. 3 for simplicity's sake. The scheme 1000 is substantially similar to the scheme 900, but a BS 105 may schedule a UE 115 with a retransmission for one HARQ process and a new transmission for another HARQ process in the same scheduled resource.

In the illustrated example of FIG. 10, at time T0, the UE 115 transmits a CG transmission 1014a in the CG resource 312a to the BS 105. The CG transmission 1014a may include a first data block or a TB associated with a HARQ process #X for traffic flow A.

The BS 105 may fail to decode the first data block from the CG transmission 1014a. The BS 105 may schedule a single resource for the UE 115 to retransmit the first data block of HARQ process #X and a new or initial transmission of a second data block of another HARQ process #Z. As shown, at the time T1, the BS 105 may transmit a scheduling grant 1030 (e.g., PDCCH DCI) to the UE 115. The scheduling grant 1030 may indicate a scheduled resource 1031 at time T2 for the UE 115 to transmit a retransmission of the first data block of the HARQ process #X and a new transmission of the second data block of the HARQ process #Z. The scheduling grant 1030 may indicate a number of TBs scheduled for the scheduled resource 1031. In some instances, the scheduling grant 1030 may indicate the HARQ process IDs (e.g., HARQ process ID #X and HARQ process ID #Z), and may indicate a NDI value of 0 for the HARQ process #X and an NDI value of 1 for the HARQ process #Z. In some instances, the scheduling grant 1030 may include a HARQ process ID field and the HARQ process ID field may indicate both HARQ ID #X and HARQ process ID #Z. The UE 115 may determine the number of TBs based on the number of HARQ process IDs included in the HARQ process ID field. The scheduling grant 1030 may also indicate transmission parameters, such as MCS, SRI, and/or precoding information including TPMI and/or RI.

Upon receiving the scheduling grant 1030, the UE 115 transmit a transmission 1034 including a retransmission of the first data block of the HARQ process #X (shown as retransmission 1014r) and an initial transmission of the second data block of the HARQ process #Z (shown as retransmission 1024) in the scheduled resource 1031. In some aspects, the UE 115 may transmit the transmission 1034 using the transmission parameters provided by the scheduling grant 1030. In some aspects, the UE 115 may determine transmission parameter(s) (e.g., MCS, SRI, and/or precoding information including TPMI and/or RI) that are different than the transmission parameter(s) provided by the scheduling grant 1030 and may transmit CG-UCI 1036 along with the transmission 1034, where the CG-UCI 1036 may indicate the actual transmission parameters (the determined transmission parameters) used for the transmission 1034.

Similar to the scheme 900, the UE 115 may utilize the same transmission parameters (e.g., MCS, SRI, precoding parameters) or separate transmission parameters for the multiple data blocks or TBs included in the scheduled transmission 1034. For instance, in some aspects, the CG-UCI 1036 may include an HARQ process ID, an NDI, and an RV for each of the first data block and second data block, COT sharing information, and the same MCS, SRI, and precoding information for both the first data block and the second data block. In some other aspects, the CG-UCI 1036 may include an HARQ process ID, an NDI, an RV, and an MCS for each of the first data block and second data block, COT sharing information, and the same SRI and precoding information for both the first data block and the second data block. In general, the UE 115 may include one or more transmission the parameters in the CG-UCI 1036.

Additionally, the UE 115 may determine a number of encoded bits for the CG-UCI 1036 based on the MCS indicated by the scheduling grant 1030. In some aspects, the UE 115 may encode the CG-UCI 1036 using the indicated MCS, while encoding the first data block and second data block using a different MCS than the indicated MCS. Additionally, the UE 115 may encode the first data block and the second data block using different MCSs.

To provide further flexibility, in some aspects, the UE 115 may transmit a data block of a different HARQ process than the HARQ process scheduled by the scheduling grant 930 in the scheme 900 or scheduled by the scheduling grant 1030 in the scheme 1000. For instance, referring to the example illustrated in FIG. 10, the UE 115 may include the retransmission 1014r of the first data block of the HARQ process #X and a transmission of a third data block of a HARQ process #W different from the HARQ process #Z in the transmission 1034, where the transmission of the third data block may be an initial transmission or a retransmission. To facilitate reception and decoding at the BS 105, the UE 115 may report the actual transmission in the CG-UCI 1036. For instance, the CG-UCI 1036 may indicate the HARQ process ID #X and the HARQ process ID #W. In general, the schemes 900 and/or 1000 can provide the UE 115 with the flexibility to determine how many HARQ processes, which HARQ processes, and what transmission parameters to be used for a transmission in a scheduled resource. In this way, the UE 115 can make the best use of a scheduled resource, for example, based on data arrival time, retransmission timer, and/or a QoS and report information associated with the actual transmission in the scheduled resource via CG-UCI. Furthermore, if the BS 105 and the UE 115 are communicating over a shared radio frequency band, the schemes 900 and 1000 can reduce LBT overhead and allow the BS 105 and the UE 115 to optimize the utilization of a transmission opportunity.

FIG. 11 illustrates a CG-based UL transmission scheme 1100 with dynamic transmission parameter indication according to one or more aspects of the present disclosure. The scheme 1100 may be employed by a UE such as the UE 115 and a BS such as the BS 105 for communications in a network such as the network 100. In FIG. 11, the x-axis represents time in some arbitrary units. The scheme 1100 is described using the same CG configurations 310 and 320 as in the scenario 300, and may use the same reference numerals as in FIG. 3 for simplicity's sake.

In the scheme 1100, a BS 105 may configure a UE 115 with multiple CG configuration each including a set of CG resources. The UE 115 may perform autonomous retransmission in a CG resource based on HARQ ACK/NACK feedback from the BS 105 and/or retransmission timer(s). The UE 115 may select a CG resource from any of the CG configuration for the retransmission and may include multiple data blocks or TBs associated with multiple HARQ processes in the selected CG resource, for example, based on a retransmission timer expiry, a HARQ ACK/NACK in a DFI, and/or traffic arrival time. The UE 115 may determine to a number of transmission/retransmissions to be transmitted in a CG resource and/or transmission parameter(s) to be used for the transmission in the CG resource. The UE 115 may report information associated with the transmission in the CG resource via CG-UCI. For instance, the UE 115 may include CG-UCI in the transmission, where the CG-UCI may indicate a number of TBs in the transmission and/or the transmission parameters used for the transmission. The scheme 1100 illustrate improvements and/or enhancements to the CG-based retransmission scenario 800 discussed above in relation to FIG. 8.

In the illustrated example of FIG. 11, at time T0, the UE 115 transmits a CG transmission 1114a in the CG resource 312a to the BS 105. The CG transmission 1114a may include a first data block or a TB associated with a HARQ process #X for traffic flow A. After transmitting the CG transmission 1114a, the UE 115 may start a retransmission timer 1102 for the HARQ process #X. The UE 115 may also monitor for a DFI (e.g., a HARQ ACK/NACK feedback) for the first data block from the BS 105.

At time T1, the UE 115 transmits a CG transmission 1124a in a CG resource 312b to the BS 105. The CG transmission 1124a may include a second data block or a TB associated with a HARQ process #Y for traffic flow A. The HARQ process #Y may be a different separate HARQ process than the HARQ process #X. Similarly, after transmitting the CG transmission 1124a, the UE 115 may start a retransmission timer 1104 for the HARQ process #Y. The UE 115 may also monitor for a DFI (e.g., a HARQ ACK/NACK feedback) for the second data block from the BS 105.

At time T2, the retransmission timer 1102 for the HARQ process #X expires. If the UE 115 has not received any DFI for the first data block from the BS 105 and the retransmission timer 1102 expires, the UE 115 may retransmit the first data block. Similarly, at time T3, the retransmission timer 1104 for the HARQ process #Y expires. If the UE 115 has not received any DFI for the second data block from the BS 105 and the retransmission timer 1104 expires, the UE 115 may retransmit the second data block.

The UE 115 may select a CG resource that is sufficient to carry both a retransmission of the first data block associated with the HARQ process #X and the second data block associated with the HARQ process #Y instead of retransmitting the first and second data blocks in separate CG resource. As shown, the UE 115 selects a next available CG resource 322c of the CG configuration 320 and transmits a transmission 1134 including a retransmission of the first data block (shown as 1114r) and a retransmission of the second data block (shown as 1124r) in the CG resource 322c. In some aspects, the UE 115 may determine transmission parameter(s) (e.g., MCS, SRI, and/or precoding information including TPMI and/or RI) that are different than the transmission parameter(s) in the CG resource 322c and may transmit CG-UCI 1136 along with the transmission 1134, where the CG-UCI 1136 may indicate the actual transmission parameters (the determined transmission parameters) used for the transmission 1134. Although FIG. 11 illustrates the CG transmission 1134 including two data blocks/TBs/ HARQ processes, it should be understood that in other examples the UE 115 may transmit any suitable number of data blocks/TBs/HARQ processes (e.g., about 3, 4, or more) in a single CG resource.

In some aspects, the UE 115 may utilize the same transmission parameters (e.g., MCS, SRI, precoding parameters) for the multiple data blocks or TBs included in the scheduled transmission 1134. For instance, the CG-UCI 1136 may include an indication of a number of data blocks or TBs in the transmission 1134, an HARQ process ID, an NDI, and an RV for each of the first data block and second data block, COT sharing information, and the same MCS, SRI, and precoding information for both the first data block and the second data block. In general, the UE 115 may include one or more of the parameters in the CG-UCI 1136.

In some aspects, the UE 115 may utilize separate transmission parameters for the multiple data blocks or TBs included in the scheduled transmission 1134. For instance, the CG-UCI 1136 may include may include an indication of a number of data blocks or TBs in the transmission 1134, an HARQ process ID, an NDI, an RV, and an MCS for each of the first data block and second data block, COT sharing information, and the same SRI and precoding information for both the first data block and the second data block. In general, the UE 115 may include one or more of the parameters in the CG-UCI 1136. In some aspects, the UE 115 can also include separate SRI and/or precoding information for the first data block and the second data block.

In some aspects, the UE 115 may determine a number of encoded bits for the CG-UCI 1136 based on the MCS configured in the CG configuration 320. In some aspects, the UE 115 may encode the CG-UCI 1136 using the configured MCS, while encoding the first data block and second data block using a different MCS than the configured MCS. Additionally, the UE 115 may encode the first data block and the second data block using different MCSs.

In some aspects, the UE 115 may also determine to transmit a retransmission of the first data block and a new transmission of a third data block associated with another HARQ process, for example, HARQ process #W, in the CG resource 322*c*. In general, the UE 115 may transmit a combination of retransmission(s) and/or new transmission(s) of multiple data blocks or TBs of different HARQ processes in a single CG resource, for example, based on data arrival time, retransmission timer, and/or a QoS and report information associated with the actual transmission in the scheduled resource via CG-UCI. Furthermore, if the BS 105 and the UE 115 are communicating over a shared radio frequency band, the scheme 1100 can reduce LBT overhead and allow the UE 115 to optimize the utilization of a transmission opportunity.

Figure 12:
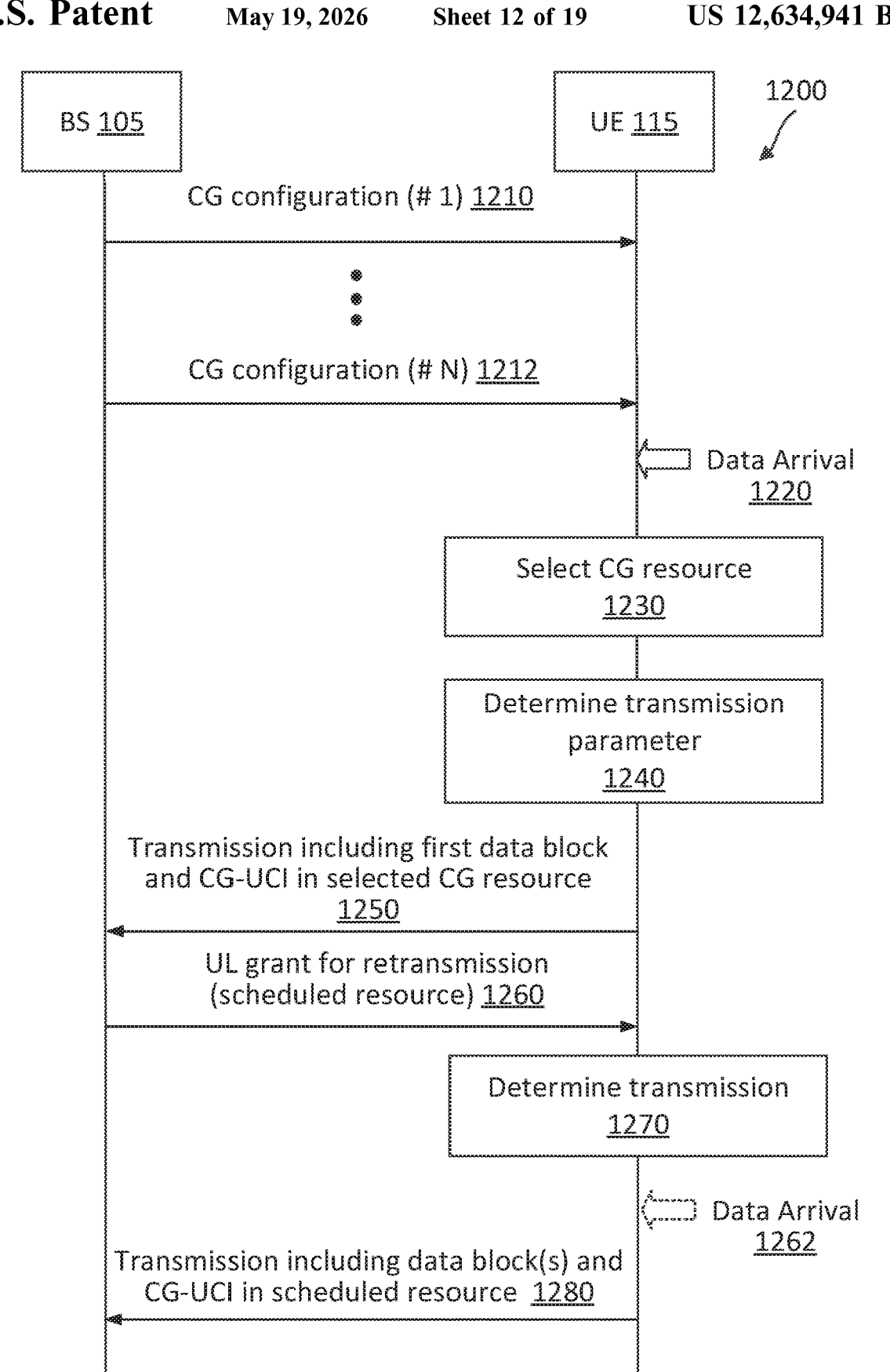
FIG. 12 is a sequence diagram illustrating a CG-based UL transmission method with dynamic transmission parameter indication according to one or more aspects of the present disclosure.

FIG. 12 is a sequence diagram illustrating a CG-based UL transmission method 1200 with scheduling-based retransmission and dynamic transmission parameter indication according to one or more aspects of the present disclosure. The method 1200 is implemented between a BS 105 and a UE 115. For example, the BS 105 may utilize one or more components, such as the processor 1502, the memory 1504, the UL communication module 1508, the transceiver 1510, the modem 1512, and the one or more antennas 1516, to execute the steps or actions of the method 1200. Similarly, the UE 115 may utilize one or more components, such as the processor 1402, the memory 1404, the UL communication module 1408, the transceiver 1410, the modem 1412, and the one or more antennas 1416, to execute the steps of the method 1200. The method 1200 may be implemented using similar mechanisms as discussed above with references to FIGS. 2-7 and 9-10. As illustrated, the method 1200 includes a number of enumerated actions, but embodiments of the method 1200 may include additional actions before, after, and in between the enumerated actions. In some embodiments, one or more of the enumerated actions may be omitted or performed in a different order.

At action 1210, the BS 105 transmits a CG configuration (#1) to the UE 115. The BS 105 may transmit N number of CG configurations to the UE 115, where N can be any suitable number (e.g., 2, 3, 4, 5 or more). For instance, at action 1212, the BS 105 transmits a CG configuration (#N) to the UE 115. The CG configuration (#1) to CG configuration (#N) may be substantially similar to the CG configurations 310, 320, 410, 420, and 430 discussed above. For instance, each of the CG configuration (#1) to CG configuration (#N) may be a CG type 1 configuration or a CG type 2 configuration and may indicate a set of CG resources similar to the CG resources 312, 322, 412, 422, and 432. Each of the CG configuration (#1) to CG configuration (#N) may be configured for a specific traffic flow (e.g., a MAC layer logical channel). In some instances, two more of the CG configuration (#1) to CG configuration (#N) can be configured for the same traffic flow. Additionally, each of the CG configuration (#1) to CG configuration (#N) may include transmission parameters (e.g., MCS, SRI, precoding information) to be used for transmission in corresponding set of CG resources.

At action 1220, the UE 115 detected data arrival for a particular traffic flow. For instance, the data may be associated with a certain application in use at the UE 115.

At action 1230, the UE 115 may select a CG resource from any of the sets of CG resource, for example, based on the arrival time of the data. For instance, the UE 115 may select a next earliest available CG resource from the sets of CG resources. In some instances, the selected CG resource may be configured for the particular traffic flow. In some instances, the selected CG resource may be associated with a different traffic flow than the particular traffic flow. In general, the UE 115 may select the CG resource irrespective of the traffic flow configured for the selected CG resource.

At action 1240, the UE determines transmission parameter(s) for transmitting the TB (including the data of the particular traffic flow), for example, based on a channel condition, the TBS, and/or a size of the selected CG resource. The transmission parameters can include an MCS, an SR, and/or precoding information including TPMI and RI. In some aspects, one or more of the determined transmission parameter(s) can be different than the transmission parameters configured for the CG resource.

In some aspects, the UE 115 may prepare the data for transmission by generating a first data block (e.g., a TB) from the data to prepare for transmission. The UE 115 may add a cyclic redundancy check (CRC) to the data. The UE 115 may associated the first data block with a certain HARQ process (e.g., a HARQ process #X). The UE 115 may encode the first data block based on the MCS and may map the encoded bits to resources (e.g., REs 212) within the selected resource. In some instances, the selected CG resource may be configured for a TBS the same as the first data block. In some instances, the selected CG resource may be configured for a different TBS than the first data block. In general, the UE 115 may select the CG resource irrespective of the TBS configured for the selected CG resource.

At action 1250, the UE transmits a transmission including the first data block and first CG-UCI in the selected CG resource. The first CG-UCI may be similar to the CG-UCI 516, 526, 616, 936, 1036, and/or 1136. The first CG-UCI may include the determined transmission parameters. Accordingly, the BS 105 may receive and decode the transmission based on the transmission parameters indicated by the first CG-UCI. As discussed above, to facilitate the reception and decoding of the first CG-UCI at the BS 105, the UE 115 may encode the first CG-UCI based on the MCS configured for the selected CG resource.

As an example, the BS 105 may fail to decode the transmission successfully. Hence, the BS 105 may determine a scheduling grant for the UE 115 to retransmit the first data block. As shown, at action 1260, the BS 105 transmits the scheduling grant to the UE 115. The scheduling grant may indicate a scheduled resource for retransmitting the first data block of the HARQ process #X.

At action 1270, upon receiving the scheduling grant, the UE 115 may determine transmission parameters (e.g., MCS, SRI, and/or precoding information including TPMI and RI) for transmitting in the scheduled resource. In some aspects, one or more of the determined transmission parameter(s) can be different than the transmission parameters indicated by the scheduling grant.

At action 1280, the UE transmits a transmission including a retransmission of the first data block (of the HARQ process

X) and second CG-UCI in the scheduled CG resource. The second CG-UCI may be similar to the CG-UCI 516, 526, 616, 936, 1036, and/or 1136. The second CG-UCI may include the determined transmission parameters. Accordingly, the BS 105 may receive and decode the transmission based on the transmission parameters indicated by the second CG-UCI. As discussed above, to facilitate the reception and decoding of the second CG-UCI at the BS 105, the UE 115 may encode the second CG-UCI based on the MCS indicating by the scheduling grant.

In some aspects, the scheduling grant provided by the BS 105 at action 1260 may indicate multiple data blocks or TBs of different HARQ processes are scheduled for the scheduled resource and may include transmission parameters to be used for transmitting in the scheduled resource as discussed above in relation to FIGS. 9 and 10. Accordingly, the UE 115 may include multiple data blocks (of different HARQ processes) in the transmission at action 1280 in accordance with the scheduling grant. In some aspects, the UE 115 may include a data block of a different HARQ process than what is scheduled by the BS 105 in the transmission at action 1280 and may indicate the different HARQ process in the second CG-UCI. For instance, the UE 115 may receive new data at action 1262 and determine to transmit the new data (a second data block associated with a HARQ process #Z different than the HARQ process #X) in the scheduled resource along with the retransmission of the first data block. In some aspects, when the UE 115 transmits multiple data blocks in the scheduled resource, the UE 115 may utilize the same transmission parameters (e.g., MCS, SRI, and/or pre-coding information including TPMI and/or RI) for all data blocks. In some other aspects, the UE 115 may utilize at least a different MCS for one of the data blocks transmitted in the scheduled resource.

Figure 13:
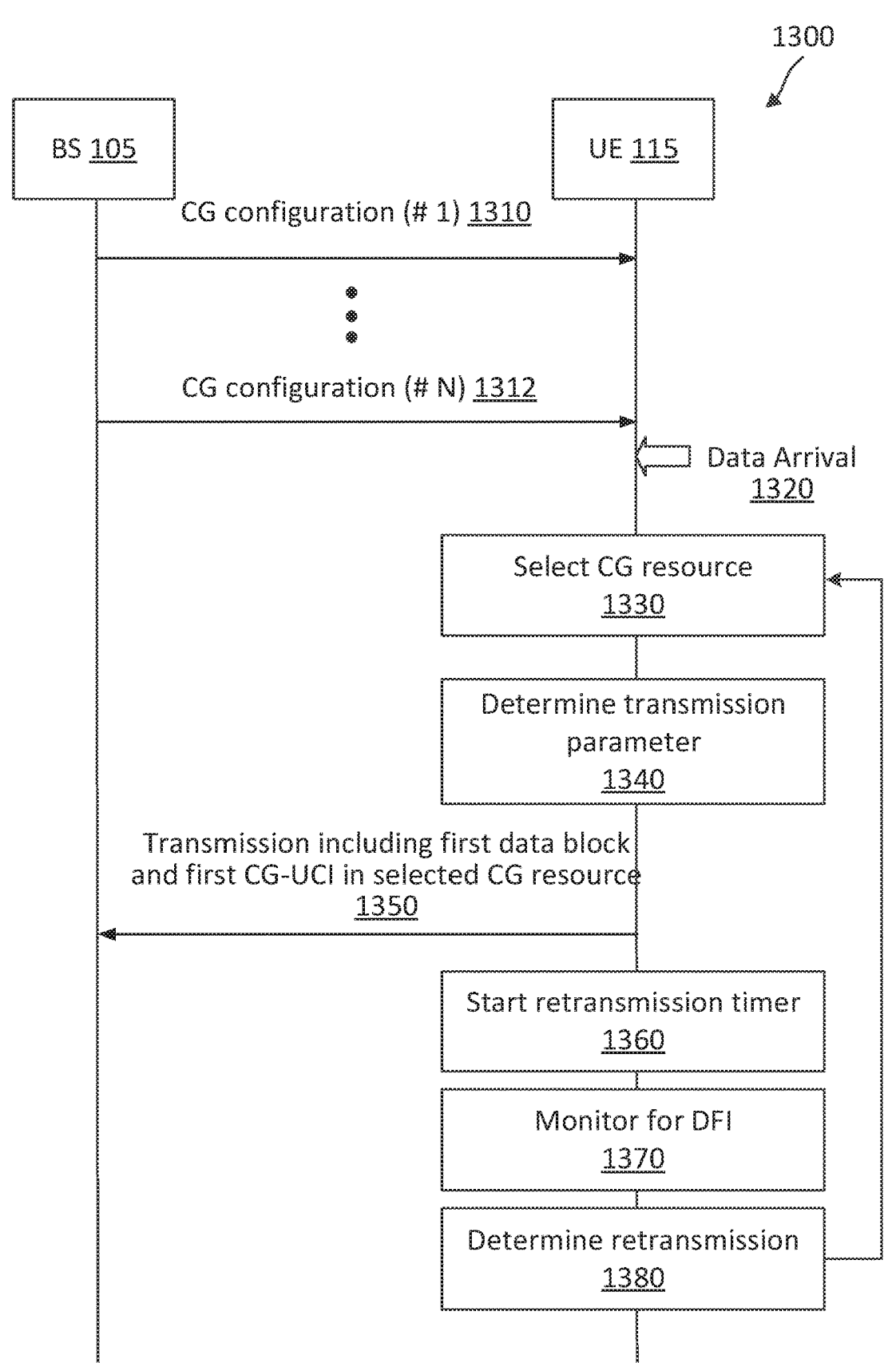
FIG. 13 is a sequence diagram illustrating a CG-based UL transmission method with dynamic transmission parameter indication according to one or more aspects of the present disclosure.

FIG. 13 is a sequence diagram illustrating a CG-based UL transmission method 1300 with CG-based retransmission and dynamic transmission parameter indication according to one or more aspects of the present disclosure. The method 1300 is implemented between a BS 105 and a UE 115. For example, the BS 105 may utilize one or more components, such as the processor 1502, the memory 1504, the UL communication module 1508, the transceiver 1510, the modem 1512, and the one or more antennas 1516, to execute the steps or actions of the method 1200. Similarly, the UE 115 may utilize one or more components, such as the processor 1402, the memory 1404, the UL communication module 1408, the transceiver 1410, the modem 1412, and the one or more antennas 1416, to execute the steps of the method 1200. The method 1200 may be implemented using similar mechanisms as discussed above with references to FIGS. 2-6, 8 and 11. As illustrated, the method 1300 includes a number of enumerated actions, but embodiments of the method 1300 may include additional actions before, after, and in between the enumerated actions. In some embodiments, one or more of the enumerated actions may be omitted or performed in a different order.

Generally speaking, the method 1300 includes features similar to method 1200 in many respects. For example, actions 1310, 1312, 1320, 1330, 1340, and 1350 are similar to actions 1210, 1212, 1220, 1230, 1240, and 1250, respectively. Accordingly, for sake of brevity, details of those actions will not be repeated here and may be referred to the corresponding descriptions above.

At action 1360, after transmitting the transmission including the first data block (of the HARQ process #X) and CG-UCI in the selected CG resource, the UE 115 may start a retransmission timer.

At action 1370, the UE 115 may monitor for a DFI (e.g., a HARQ ACK/NACK feedback) from the BS 105.

At action 1380, the UE 115 may determine to retransmit the first data block, based on an expiration of the retransmission timer and/or no DFI is received for the first data block. The UE 115 may repeat the action 1330-1350 to perform the retransmission.

In some aspects, the UE 115 may include multiple data blocks in the transmission at action 1350. For instance, the UE 115 may transmit an initial transmission of the first data block (of the HARQ process #X) and an initial of a second data block (of a HARQ process #Y different than the HARQ process #X) in the selected CG resource. In some aspects, the UE 115 may transmit an initial transmission of the first data block (of the HARQ process #X) and a retransmission of a second data block (of a HARQ process #Y different than the HARQ process #X) in the selected CG resource. In some aspects, the UE 115 may transmit a retransmission of the first data block (of the HARQ process #X) and an initial transmission of a second data block (of a HARQ process #Y different than the HARQ process #X) in the selected CG resource. In some aspects, the UE 115 may transmit a retransmission of the first data block (of the HARQ process #X) and a retransmission of a second data block (of a HARQ process #Y different than the HARQ process #X) in the selected CG resource. In general, the UE 115 may transmit any suitable number of data blocks or TBs (e.g., about 2, 3, 4 or more) in a single CG resource, where each data block may a new or initial transmission or a retransmission. In some other aspects, the UE 115 may utilize the same transmission parameters (e.g., MCS, SRI, and/or precoding information including TPMI and/or RI) for all data blocks. In some other aspects, the UE 115 may utilize at least a different MCS for one of the data blocks transmitted in the scheduled resource. The UE 115 may indicate the number of TBs and/or corresponding transmission parameters via CG-UCI transmitted along with the TBs in a single CG resource.

Figure 14:
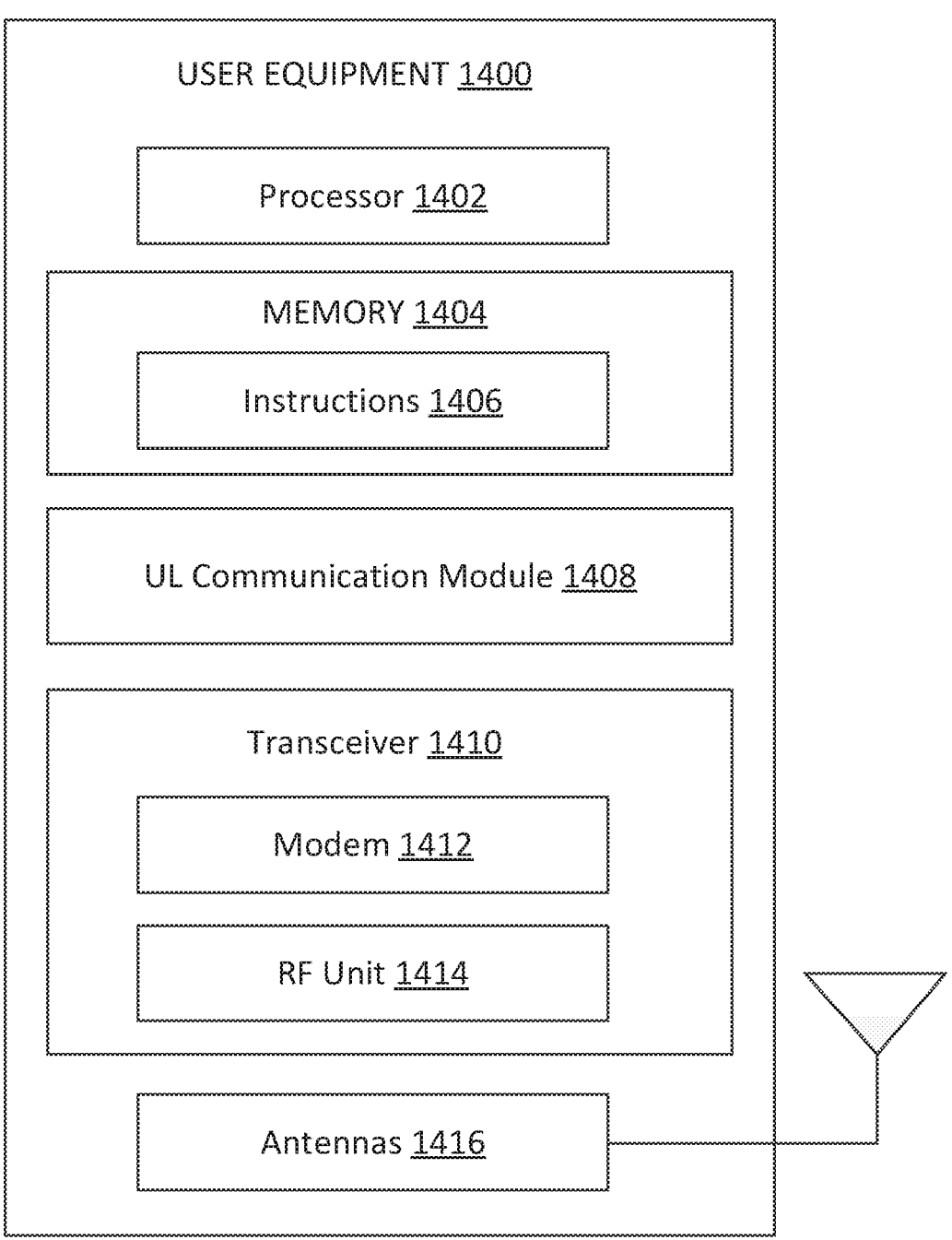
FIG. 14 is a block diagram of an exemplary user equipment (UE) according to some aspects of the present disclosure.

FIG. 14 is a block diagram of an exemplary UE 1400 according to some aspects of the present disclosure. The UE 1400 may be a UE 115 discussed above in FIG. 1. As shown, the UE 1400 may include a processor 1402, a memory 1404, a UL communication module 1408, a transceiver 1410 including a modem subsystem 1412 and a radio frequency (RF) unit 1414, and one or more antennas 1416. These elements may be in direct or indirect communication with each other, for example via one or more buses.

The processor 1402 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 1404 may include a non-transitory computer-readable medium. The memory 1404 may store, or have recorded thereon, instructions 1406. The instructions 1406 may include instructions that, when executed by the processor 1402, cause the processor 1402 to perform the operations described herein with reference to the UEs 115 in connection with aspects of the present disclosure, for example, aspects of FIGS. 1-13 and 16-17. Instructions 1406 may also be referred to as program code. The program code may be for causing a wireless communication device to perform these operations, for example by causing one or more processors (such as processor 1402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The UL communication module 1408 may be implemented via hardware, software, or combinations thereof. For example, the UL communication module 1408 may be implemented as a processor, circuit, and/or instructions 1406 stored in the memory 1404 and executed by the processor 1402. In some instances, the UL communication module 1408 can be integrated within the modem subsystem 1412. For example, the UL communication module 1408 can be implemented by a combination of software components (e.g., executed by a DSP or a general processor) and hardware components (e.g., logic gates and circuitry) within the modem subsystem 1412.

The UL communication module 1408 may communicate with various components of the UE 1400 to perform various aspects of the present disclosure, for example, aspects of FIGS. 1-13 and 16-17. In some aspects, the UL communication module 1408 is configured to receive, from a BS (e.g., a BS 105), a first configuration indicating a first CG resource and a first transmission parameter associated with the first CG resource, determine a second transmission parameter different from the first transmission parameter for transmitting a data block in the first CG resource, and transmit, to the BS in the first CG resource, a transmission including the data block and CG-UCI indicating the second transmission parameter. In some instances, the first transmission parameter may include a first MCS, and the second transmission parameter may include a second MCS different than the first MCS. In some instances, the first transmission parameter may include a first SRI, and the second transmission parameter may include a second SRI different than the first SRI. In some instances, the first transmission parameter may include first precoding information (e.g., TPMI and/or RI), and the second transmission parameter may include second precoding information different than the first precoding information.

In some aspects, the UL communication module 1408 is configured to select the first CG resource based on an arrival time associated with the data block and irrespective of a traffic flow associated with the first CG resource as discussed above in relation to FIGS. 5 and 13. In some aspects, the UL communication module 1408 is configured select the first CG resource based on a DFI or HARQ ACK/NACK associated with the data block or a retransmission timer associated with the data block and irrespective of a TBS associated with the first CG resource as discussed above in relation to FIGS. 6 and 13. In some aspects, the UL communication module 1408 is configured to transmit multiple data blocks or TBs (e.g., including new and/or retransmitted data blocks) in the CG resource as discussed above in relation to FIGS. 11 and 13.

In some aspects, the UL communication module 1408 is configured to transmit, to a BS (e.g., a BS 105), a first data block in a first CG resource, receive, from the BS, a scheduling grant indicating a first transmission parameter and a scheduled resource for at least a retransmission of the first data block, determine a second transmission parameter different from the first transmission parameter for transmitting a second data block in the scheduled resource, and transmit, in the scheduled resource, a transmission including the second data block and CG-UCI indicating the second transmission parameter. In some aspects, the scheduling grant schedule multiple data blocks or TBs (e.g., including new and/or retransmitted data blocks) in the scheduled resource as discussed above in relation to FIGS. 9-10 and 12.

As shown, the transceiver 1410 may include the modem subsystem 1412 and the RF unit 1414. The transceiver 1410 can be configured to communicate bi-directionally with other devices, such as the BSs 105. The modem subsystem 1412 may be configured to modulate and/or encode data according to a MCS, e.g., a LDPC coding scheme, a turbo coding scheme, a convolutional coding scheme, a polar coding scheme, a digital beamforming scheme, etc. The RF unit 1414 may be configured to process (e.g., perform analog to digital conversion or digital to analog conversion, etc.) modulated/encoded data (e.g., CG-UCI, CG transmission, PUSCH transmission, transmission parameters) from the modem subsystem 1412 (on outbound transmissions) or of transmissions originating from another source such as a UE 115 or a BS 105. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the UE 1400 to enable the UE 1400 to communicate with other devices.

The RF unit 1414 may provide the modulated and/or processed data, e.g. data packets (or, more generally, data messages that may contain one or more data packets and other information), to the antennas 1416 for transmission to one or more other devices. The antennas 1416 may further receive data messages transmitted from other devices and provide the received data messages for processing and/or demodulation at the transceiver 1410. The transceiver 1410 may provide the demodulated and decoded data (e.g., RRC configurations, CG configurations, CG activation DCI, scheduling grant, HARQ ACK/NACK, DFI) from the modem subsystem 1412 (on outbound transmissions) to the UL communication module 1408 for processing. The antennas 1416 may include multiple antennas of similar or different designs in order to sustain multiple transmission links.

In an aspect, the UE 1400 can include multiple transceivers 1410 implementing different RATs (e.g., NR and LTE). In an aspect, the UE 1400 can include a single transceiver 1410 implementing multiple RATs (e.g., NR and LTE). In an aspect, the transceiver 1410 can include various components, where different combinations of components can implement different RATs.

Figure 15:
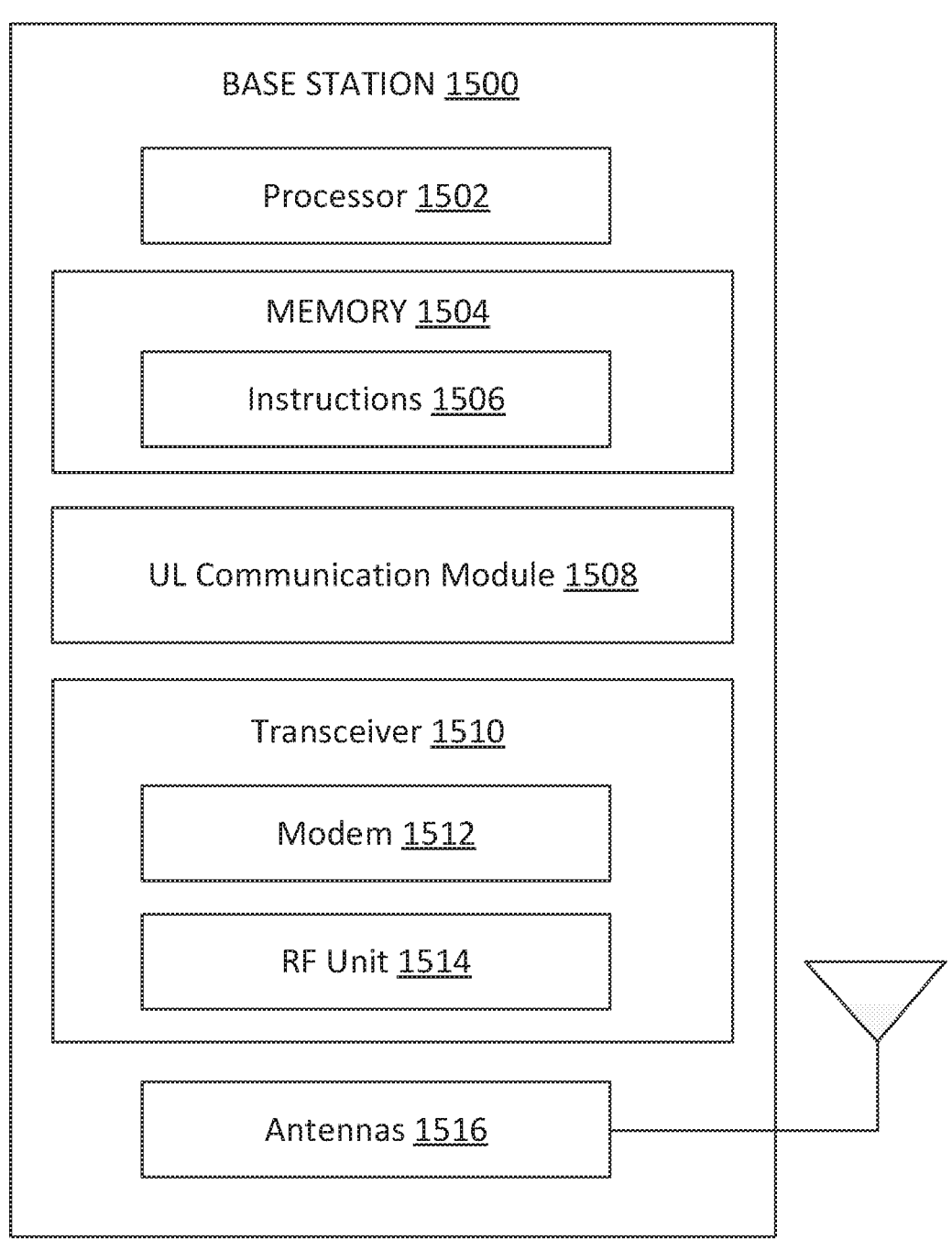
FIG. 15 is a block diagram of an exemplary base station (BS) according to some aspects of the present disclosure.

FIG. 15 is a block diagram of an exemplary BS 1500 according to some aspects of the present disclosure. The BS 1500 may be a BS 105 in the network 150 as discussed above in FIG. 1. As shown, the BS 1500 may include a processor 1502, a memory 1504, an UL communication module 1508, a transceiver 1510 including a modem subsystem 1512 and an RF unit 1514, and one or more antennas 1516. These elements may be in direct or indirect communication with each other, for example via one or more buses.

The processor 1502 may include a CPU, a DSP, an ASIC, a controller, an FPGA device, another hardware device, a firmware device, or any combination thereof configured to perform the operations described herein. The processor 1502 may also be implemented as a combination of computing devices, e.g., a combination of a DSP and a microprocessor, a plurality of microprocessors, one or more microprocessors in conjunction with a DSP core, or any other such configuration.

The memory 1504 may include a cache memory (e.g., a cache memory of the processor 1502), RAM, MRAM, ROM, PROM, EPROM, EEPROM, flash memory, solid state memory device, hard disk drives, other forms of volatile and non-volatile memory, or a combination of different types of memory. In an aspect, the memory 1504 includes a non-transitory computer-readable medium. The memory 1504 may store instructions 1506. The instructions 1506 may include instructions that, when executed by the processor 1502, cause the processor 1502 to perform operations described herein, for example, aspects of FIGS. 1-13 and 18-19. Instructions 1506 may also be referred to as code, which may be interpreted broadly to include any type of computer-readable statement(s) as discussed above.

The UL communication module 1508 may be implemented via hardware, software, or combinations thereof. For example, the UL communication module 1508 may be implemented as a processor, circuit, and/or instructions 1506 stored in the memory 1504 and executed by the processor 1502. In some instances, the UL communication module 1508 can be integrated within the modem subsystem 1512. For example, the UL communication module 1508 can be implemented by a combination of software components (e.g., executed by a DSP or a general processor) and hardware components (e.g., logic gates and circuitry) within the modem subsystem 1512.

The UL communication module 1508 may communicate with various components of the BS 1500 to perform various aspects of the present disclosure, for example, aspects of FIGS. 1-13 and 18-19. In some aspects, the UL communication module 1508 is configured to transmit, to a UE (e.g., a UE 115, 1400), a first configuration indicating a first CG resource and a first transmission parameter associated with the first CG resource, and receive, from the BS in the first CG resource, a transmission including the data block and CG-UCI indicating a second transmission parameter different from the first transmission parameter. In some instances, the first transmission parameter may include a first MCS, and the second transmission parameter may include a second MCS different than the first MCS. In some instances, the first transmission parameter may include a first SRI, and the second transmission parameter may include a second SRI different than the first SRI. In some instances, the first transmission parameter may include first precoding information (e.g., TPMI and/or RI), and the second transmission parameter may include second precoding information different than the first precoding information.

In some aspects, the UL communication module 1508 is configured to configure the first CG resource for a first traffic flow and receive the data block of a second traffic flow different than the first traffic flow in the first CG resource as discussed above in relation to FIGS. 5 and 13. In some aspects, the UL communication module 1508 is configured to configure a first TBS for the first CG resource an receive the data block having a second TBS different than the first TBS in the first CG resource as discussed above in relation to FIGS. 6 and 13. In some aspects, the UL communication module 1508 is configured to receive multiple data blocks or TBs (e.g., including new and/or retransmitted data blocks) in the CG resource as discussed above in relation to FIGS. 11 and 13.

In some aspects, the UL communication module 1508 is configured to receive, from a UE (e.g., a UE 115 or 1400), a first data block in a first CG resource, transmit, to the UE, a scheduling grant indicating a first transmission parameter and a scheduled resource for at least a retransmission of the first data block, and receive, from the UE in the scheduled resource, a transmission including the second data block and CG-UCI indicating a second transmission parameter different from the first transmission parameter. In some aspects, the scheduling grant schedule multiple data blocks or TBs (e.g., including new and/or retransmitted data blocks) in the scheduled resource as discussed above in relation to FIGS. 9-10 and 12.

As shown, the transceiver 1510 may include the modem subsystem 1512 and the RF unit 1514. The transceiver 1510 can be configured to communicate bi-directionally with other devices, such as the BSs 105 and/or another core network element. The modem subsystem 1512 may be configured to modulate and/or encode the data from the memory 1504 and/or the UL communication module 1508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 1514 may be configured to process (e.g., perform analog to digital conversion or digital to analog conversion, etc.) modulated/encoded data (e.g., RRC configurations, CG configurations, CG activation DCI, scheduling grant, HARQ ACK/NACK, DFI) from the modem subsystem 1512 (on outbound transmissions) or of transmissions originating from another source such as a UE 115. The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the BS 1500 to enable the BS 1500 to communicate with other devices.

The RF unit 1514 may provide the modulated and/or processed data, e.g. data packets (or, more generally, data messages that may contain one or more data packets and other information), to the antennas 1516 for transmission to one or more other devices. The antennas 1516 may further receive data messages transmitted from other devices. The antennas 1516 may provide the received data messages for processing and/or demodulation at the transceiver 1510. The transceiver 1510 may provide the demodulated and decoded data (e.g., CG-UCI, CG transmission, PUSCH transmission, transmission parameters) to the UL communication module 1508 for processing. The antennas 1516 may include multiple antennas of similar or different designs in order to sustain multiple transmission links. The RF unit 1514 may configure the antennas 1516.

In an aspect, the BS 1500 can include multiple transceivers 1510 implementing different RATs (e.g., NR and LTE). In an aspect, the BS 1500 can include a single transceiver 1510 implementing multiple RATs (e.g., NR and LTE). In an aspect, the transceiver 1510 can include various components, where different combinations of components can implement different RATs.

FIG. 16 is a flow diagram of a communication method 1600 according to some aspects of the present disclosure.

Aspects of the method 1600 can be executed by a UE, such as the UEs 115 and/or 1400. For example, a UE 1400 may utilize one or more components, such as the processor 1402, the memory 1404, the UL communication module 1408, the transceiver 1410, the modem 1412, and the one or more antennas 1416, to execute the steps of method 1600. The method 1600 may employ similar mechanisms as discussed above with respect to FIGS. 1-6, 8, 11, and 13. As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, a UE (e.g., a UE 115 or a UE 1400) receives, from a BS (e.g., a BS 105 or a BS 1500), a first configuration indicating a first CG resource and a first transmission parameter associated with the first CG resource. The first configuration may be similar to the CG configurations 310, 320, 410, 420, and/or 430, and the first CG resource may be similar to the CG resources 312, 322, 412, 422, and/or 432. In some aspects, the UE may utilize one or more components, such as the processor 1402, the memory 1404, the UL communication module 1408, the transceiver 1410, the modem 1412, and the one or more antennas 1416, to perform the operations at block 1610.

At block 1620, the UE determines a second transmission parameter for transmitting a data block in the first CG resource, the second transmission parameter being different from the first transmission parameter. In some aspects, the second transmission parameter may include at least one an MCS, an SRI, or precoding information. In some aspects, the UE may utilize one or more components, such as the processor 1402, the memory 1404, the UL communication module 1408, the transceiver 1410, the modem 1412, and the one or more antennas 1416, to perform the operations at block 1620.

At block 1630, the UE transmits, to the BS in the first CG resource, a transmission including the data block and CG-UCI indicating the second transmission parameter, the data block being based on the second transmission parameter. The CG-UCI may be similar to the CG-UCI 516, 526, 616, 936, 1036, and/or 1136. In some aspects, the UE may utilize one or more components, such as the processor 1402, the memory 1404, the UL communication module 1408, the transceiver 1410, the modem 1412, and the one or more antennas 1416, to perform the operations at block 1630.

In some aspects, the first CG resource is associated with a first traffic flow, and the data block received at block 1820 may be associated with a second traffic flow different from the first traffic flow.

In some aspects, the UE may further receive, from the BS, a second configuration for a second CG resource associated with the second traffic flow. The UE may further select the first CG resource for transmitting the data block based on at least one of an arrival time, or a HARQ/ACK feedback, or a retransmission timer associated with the data block.

In some aspects, the first configuration received at block 1610 may further indicate a first transport block size, and the data block received at block 1820 may have a second transport block size different from the first transport block size.

In some aspects, the transmission received at block 1820 may include an initial transmission (a new transmission) of the data block associated with a HARQ process.

In some aspects, the transmission received at block 1820 may include a retransmission of the data block associated with a first HARQ process.

In some aspects, the transmission received at block 1820 may include the data block associated with a first HARQ process and a data block associated with a second HARQ process different from the first HARQ process. In some aspects, the transmission received at block 1820 may include a retransmission of the data block associated with the first HARQ process and a retransmission of the data block associated with the second HARQ process. In some aspects, the transmission transmitted at block 1630 may include a retransmission of the data block associated with the first HARQ process and an initial transmission of the data block associated with the second HARQ process. In some aspects, the transmission transmitted at block 1630 may include the CG-UCI further indicating a number of data blocks in the transmission. In some aspects, the transmission transmitted at block 1630 may include the second transmission parameter indicating at least one of a common MCS, a common SRI, or common precoding information for the data block associated with the first HARQ process and the data block associated with the second HARQ process. In some aspects, the transmission transmitted at block 1630 may include the second transmission parameter indicating a first MCS for the data block associated with the first HARQ process and a second MCS for the data block associated with the second HARQ process. In some aspects, the first MCS may be different from the second MCS. In some aspects, as part of transmitting the transmission at block 1630, the UE may transmit the CG-UCI based on the first transmission parameter.

FIG. 17 is a flow diagram of a communication method 1700 according to some aspects of the present disclosure. Aspects of the method 1700 can be executed by a UE, such as the UEs 115 and/or 1400. For example, a UE 1400 may utilize one or more components, such as the processor 1402, the memory 1404, the UL communication module 1408, the transceiver 1410, the modem 1412, and the one or more antennas 1416, to execute the steps of method 1700. The method 1700 may employ similar mechanisms as discussed above with respect to FIGS. 1-7, 9-10, and 12. As illustrated, the method 1700 includes a number of enumerated steps, but aspects of the method 1700 may include additional steps before, after, and in between the enumerated steps. In some aspects, one or more of the enumerated steps may be omitted or performed in a different order.

At block 1710, a UE (e.g., a UE 115 or a UE 1400) transmits, to a BS (e.g., a BS 105 or a BS 1500), a first data block in a first CG resource. The first CG resource may be similar to the CG resources 312, 322, 412, 422, and/or 432. In some aspects, the UE may utilize one or more components, such as the processor 1402, the memory 1404, the UL communication module 1408, the transceiver 1410, the modem 1412, and the one or more antennas 1416, to perform the operations at block 1710.

At block 1720, the UE receives, from the BS, a scheduling grant indicating a first transmission parameter and a scheduled resource for at least a retransmission of the first data block. The scheduling grant may be similar to the scheduling grants 930 and/or 1030. In some aspects, the UE may utilize one or more components, such as the processor 1402, the memory 1404, the UL communication module 1408, the transceiver 1410, the modem 1412, and the one or more antennas 1416, to perform the operations at block 1720.

At block 1730, the UE determines a second transmission parameter for transmitting a second data block in the scheduled resource, the second transmission parameter being different from the first transmission parameter. In some aspects, the second transmission parameter may include at least one of an MCS, an SRI, or precoding information. In some aspects, the UE may utilize one or more components, such as the processor 1402, the memory 1404, the UL communication module 1408, the transceiver 1410, the modem 1412, and the one or more antennas 1416, to perform the operations at block 1730.

At block 1740, the UE transmits, in the scheduled resource, a transmission including the second data block and CG-UCI indicating the second transmission parameter. In some aspects, the UE may utilize one or more components, such as the processor 1402, the memory 1404, the UL communication module 1408, the transceiver 1410, the modem 1412, and the one or more antennas 1416, to perform the operations at block 1740.

In some aspects, the first data block may be associated with a first HARQ process, wherein the second data block corresponds to the first data block, and the transmission transmitted at block 1740 may include a retransmission of the first data block.

In some aspects, the first data block may be associated with a first HARQ process, and the transmission transmitted at block 1740 may include the second data block associated with a second HARQ process different from the first HARQ process.

In some aspects, the first data block may be associated with a first HARQ process, and the transmission transmitted at block 1740 may include a retransmission of the first data block and a transmission of the second data block associated with a second HARQ process different from the first HARQ process. In some aspects, the transmission transmitted at block 1740 may include an initial transmission of the second data block. In some aspects, the transmission transmitted at block 1740 may include a retransmission of the second data block. In some aspects, the scheduling grant received at block 1720 may further indicate a number of data blocks, and as part of transmitting the transmission transmitted at block 1740, the UE may transmit the first data block and the second data block further based on the number of data blocks. In some aspects, the transmission transmitted at block 1740 may include the second transmission parameter indicating at least one of a common MCS, a common SRI, or common precoding information for the first data block and the second data block. In some aspects, the second transmission parameter may indicate a first MCS for the first data block and a second MCS for the second data block. In some aspects, the first MCS may be different from the second MCS.

In some aspects, as part of transmitting the transmission at block 1740, the UE may transmit the CG-UCI based on the first transmission parameter indicated by the scheduling grant.

FIG. 18 is a flow diagram of a communication method 1800 according to some aspects of the present disclosure. Aspects of the method 1800 can be executed by a BS, such as the BSs 105 and/or 1500. For example, a BS 1500 may utilize one or more components, such as the processor 1502, the memory 1504, the UL communication module 1508, the transceiver 1510, the modem 1512, and the one or more antennas 1516, to execute the steps of method 1800. The method 1800 may employ similar mechanisms as discussed above with respect to FIGS. 1-6, 8, 11, and 13. As illustrated, the method 1800 includes a number of enumerated steps, but aspects of the method 1800 may include additional steps before, after, and in between the enumerated steps. In some aspects, one or more of the enumerated steps may be omitted or performed in a different order.

At block 1810, a BS (e.g., a BS 105 or 1500) transmits, to a UE (e.g., a UE 115 or 1400), a first configuration indicating a first configured grant (CG) resource and a first transmission parameter associated with the first CG resource. The first configuration may be similar to the CG configurations 310, 320, 410, 420, and/or 430, and the first CG resource may be similar to the CG resources 312, 322, 412, 422, and/or 432. In some aspects, the BS may utilize one or more components, such as the processor 1502, the memory 1504, the UL communication module 1508, the transceiver 1510, the modem 1512, and the one or more antennas 1516, to perform the operations at block 1810.

At block 1820, the BS receives, from the UE in the first CG resource, a transmission including a data block and CG-UCI indicating a second transmission parameter different than the first transmission parameter, the data block being based on the second transmission parameter. The CG-UCI may be similar to the CG-UCI 516, 526, 616, 936, 1036, and/or 1136. In some aspects, the second transmission parameter may include at least one an MCS, an SRI, or precoding information. In some aspects, the BS may utilize one or more components, such as the processor 1502, the memory 1504, the UL communication module 1508, the transceiver 1510, the modem 1512, and the one or more antennas 1516, to perform the operations at block 1820.

In some aspects, the first CG resource is associated with a first traffic flow, and the data block received at block 1820 may be associated with a second traffic flow different from the first traffic flow. In some aspects, the BS may further transmit, to the UE, a second configuration for a second CG resource associated with the second traffic flow.

In some aspects, the first configuration transmitted at block 1810 may further indicate a first transport block size, and the data block received at block 1820 may have a second transport block size different from the first transport block size.

In some aspects, the transmission received at block 1820 may include an initial transmission (a new transmission) of the data block associated with a HARQ process.

In some aspects, the transmission received at block 1820 may include a retransmission of the data block associated with a first HARQ process.

In some aspects, the transmission received at block 1820 may include the data block associated with a first HARQ process and a data block associated with a second HARQ process different from the first HARQ process. In some aspects, the transmission received at block 1820 may include a retransmission of the data block associated with the first HARQ process and a retransmission of the data block associated with the second HARQ process. In some aspects, the transmission received at block 1820 may include a retransmission of the data block associated with the first HARQ process and an initial transmission of the data block associated with the second HARQ process. In some aspects, the transmission received at block 1820 may include the CG-UCI further indicating a number of data blocks in the transmission. In some aspects, the transmission received at block 1820 may include the second transmission parameter indicating at least one of a common MCS, a common SRI, or common precoding information for the data block associated with the first HARQ process and the data block associated with the second HARQ process. In some aspects, the transmission received at block 1820 may include the second transmission parameter indicating a first MCS for the data block associated with the first HARQ process and a second MCS for the data block associated with the second HARQ process. In some aspects, the first MCS may be different from the second MCS. In some aspects, as part of receiving the transmission at block 1820, the BS may receive the CG-UCI based on the first transmission parameter.

FIG. 19 is a flow diagram of a communication method 1900 according to some aspects of the present disclosure. Aspects of the method 1900 can be executed by a BS, such as the BSs 105 and/or 1500. For example, a BS 1500 may utilize one or more components, such as the processor 1502, the memory 1504, the UL communication module 1508, the transceiver 1510, the modem 1512, and the one or more antennas 1516, to execute the steps of method 1900. The method 1900 may employ similar mechanisms as discussed above with respect to FIGS. 1-7, 9-10, and 12. As illustrated, the method 1900 includes a number of enumerated steps, but aspects of the method 1900 may include additional steps before, after, and in between the enumerated steps. In some aspects, one or more of the enumerated steps may be omitted or performed in a different order.

At block 1910, a BS (e.g., a BS 105 or 1500) receives, from a UE (e.g., a UE 115 or 1400), a first data block in a first CG resource. The first CG resource may be similar to the CG resources 312, 322, 412, 422, and/or 432. In some aspects, the BS may utilize one or more components, such as the processor 1502, the memory 1504, the UL communication module 1508, the transceiver 1510, the modem 1512, and the one or more antennas 1516, to perform the operations at block 1910.

At block 1920, the BS transmits, to the UE, a scheduling grant indicating a first transmission parameter and a scheduled resource for at least a retransmission of the first data block. The scheduling grant may be similar to the scheduling grants 930 and/or 1030. In some aspects, the BS may utilize one or more components, such as the processor 1502, the memory 1504, the UL communication module 1508, the transceiver 1510, the modem 1512, and the one or more antennas 1516, to perform the operations at block 1920.

At block 1930, the BS receives, from the UE in the scheduled resource, a transmission including a second data block and CG-UCI indicating a second transmission parameter different than the first transmission parameter. The CG-UCI may be similar to the CG-UCI 516, 526, 616, 936, 1036, and/or 1136. In some aspects, the second transmission parameter may include at least one an MCS, an SRI, or precoding information. In some aspects, the BS may utilize one or more components, such as the processor 1502, the memory 1504, the UL communication module 1508, the transceiver 1510, the modem 1512, and the one or more antennas 1516, to perform the operations at block 1930.

In some aspects, the first data block may be associated with a first HARQ process, wherein the second data block corresponds to the first data block, and the transmission received at block 1930 may include a retransmission of the first data block.

In some aspects, the first data block may be associated with a first HARQ process, and the transmission received at block 1930 may include the second data block associated with a second HARQ process different from the first HARQ process.

In some aspects, the first data block may be associated with a first HARQ process, and the transmission received at block 1930 may include a retransmission of the first data block and a transmission of the second data block associated with a second HARQ process different from the first HARQ process. In some aspects, the transmission received at block 1930 may include an initial transmission of the second data block. In some aspects, the transmission received at block

1930 may include a retransmission of the second data block. In some aspects, the scheduling grant transmitted at block 1920 may further indicate a number of data blocks, and as part of receiving the transmission at block 1930, the BS may receive the first data block and the second data block further based on the number of data blocks. In some aspects, the transmission received at block 1930 may include the second transmission parameter indicating at least one of a common MCS, a common SRI, or common precoding information for the first data block and the second data block. In some aspects, the second transmission parameter may indicate a first MCS for the first data block and a second MCS for the second data block. In some aspects, the first MCS may be different from the second MCS.

In some aspects, as part of receiving the transmission at block 1930, the BS may receive the CG-UCI based on the first transmission parameter indicated by the scheduling grant.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:

receiving, from a base station (BS), a first configuration indicating a first configured grant (CG) resource and a first transmission parameter associated with the first CG resource;

determining a second transmission parameter for transmitting a data block in the first CG resource, the second transmission parameter being different from the first transmission parameter;

transmitting, to the BS in the first CG resource, a transmission including the data block and configured grant-uplink control information (CG-UCI) indicating the second transmission parameter, the data block being based on the second transmission parameter, wherein the first CG resource is associated with a first traffic flow, and wherein the transmitting the transmission comprises: transmitting the data block associated with a second traffic flow different from the first traffic flow;

receiving, from the BS, a second configuration for a second CG resource associated with the second traffic flow; and selecting the first CG resource for transmitting the data block based on at least one of an arrival time, or a hybrid automatic repeat request (HARQ) acknowledgement/negative-acknowledgement (ACK/NACK) feedback, or a retransmission timer associated with the data block.

2. The method of claim 1, wherein the transmitting the transmission comprises:

transmitting the second transmission parameter indicating at least one of a modulation coding scheme (MCS), a sound reference signal resource indicator (SRI), or precoding information.

3. The method of claim 1, wherein the transmitting the transmission comprises:

transmitting, in the first CG resource, the data block associated with a first hybrid automatic repeat request (HARQ) process and a data block associated with a second HARQ process different from the first HARQ process.

4. The method of claim 3, wherein the transmitting the transmission further comprises:

transmitting the second transmission parameter indicating at least one of a common MCS, a common SRI, or common precoding information for the data block associated with the first HARQ process and the data block associated with the second HARQ process.

5. The method of claim 3, wherein the transmitting the transmission further comprises:

transmitting the second transmission parameter indicating a first MCS for the data block associated with the first HARQ process and a second MCS for the data block associated with the second HARQ process, wherein the first MCS is different from the second MCS.

6. The method of claim 1, wherein the transmitting the transmission further comprises:

transmitting the CG-UCI based on the first transmission parameter.

7. A method of wireless communication performed by a first user equipment (UE), the method comprising:

transmitting, to a base station (BS), a first data block in a first configured grant (CG) resource;

receiving, from the BS, a scheduling grant indicating:

a scheduled resource for at least a retransmission of the first data block; and a first transmission parameter;

determining a second transmission parameter for transmitting a second data block in the scheduled resource, the second transmission parameter being different from the first transmission parameter; and transmitting, in the scheduled resource, a transmission including the second data block and configured grant-uplink control information (CG-UCI) indicating the second transmission parameter, wherein the first data block is associated with a first hybrid automatic repeat request (HARQ) process, and wherein the transmitting the transmission further comprises:

transmitting, in the scheduled resource, a retransmission of the first data block and a transmission of the second data block associated with a second HARQ process different from the first HARQ process.

8. The method of claim 7, wherein the transmitting the transmission comprises:

transmitting the second transmission parameter, the second transmission parameter including at least one of a modulation coding scheme (MCS), a sound reference signal resource indicator (SRI), or precoding information.

9. The method of claim 7, wherein:

the receiving the scheduling grant comprises:

receiving the scheduling grant further indicating a number of data blocks; and the transmitting the transmission including the first data block and the second data block is further based on the number of data blocks.

10. The method of claim 7, wherein the transmitting the transmission further comprises:

transmitting the second transmission parameter indicating a first modulation coding scheme (MCS) for the first data block and a second MCS for the second data block, wherein the first MCS is different from the second MCS.

11. The method of claim 7, wherein the transmitting the transmission further comprises:

transmitting the CG-UCI based on the first transmission parameter indicated by the scheduling grant.

12. A method of wireless communication performed by a base station (BS), the method comprising:

receiving, from a user equipment (UE), a first data block in a first configured grant (CG) resource;

transmitting, to the UE, a scheduling grant indicating:

a scheduled resource for at least a retransmission of the first data block; and a first transmission parameter; and receiving, in the scheduled resource, a transmission including a second data block and configured grant-uplink control information (CG-UCI) indicating a second transmission parameter different than the first transmission parameter, wherein the first data block is associated with a first hybrid automatic repeat request (HARQ) process, and wherein the receiving the transmission further comprises: receiving, in the scheduled resource, a retransmission of the first data block and a transmission of the second data block associated with a second HARQ process different from the first HARQ process; and wherein: the transmitting the scheduling grant comprises:
    transmitting the scheduling grant further indicating a number of data blocks; and
        the receiving the transmission including the first data block and the second data block is further based on the number of data blocks.

13. The method of claim 12, wherein the receiving the transmission comprises:
    receiving the second transmission parameter, the second transmission parameter including at least one of a modulation coding scheme (MCS), a sound reference signal resource indicator (SRI), or precoding information.

14. The method of claim 12, wherein the first data block is associated with a first hybrid automatic repeat request (HARQ) process, wherein the second data block corresponds to the first data block, and wherein the receiving the transmission further comprises:
    receiving, in the scheduled resource, a retransmission of the first data block.

15. The method of claim 12, wherein the first data block is associated with a first hybrid automatic repeat request (HARQ) process, and wherein the receiving the transmission further comprises:
    receiving, in the scheduled resource, the second data block associated with a second HARQ process different from the first HARQ process.

16. The method of claim 12, wherein the receiving the transmission further comprises:
    receiving the second transmission parameter indicating a first modulation coding scheme (MCS) for the first data block and a second MCS for the second data block, wherein the first MCS is different from the second MCS.

17. The method of claim 12, wherein the receiving the transmission further comprises:
    receiving the CG-UCI based on the first transmission parameter indicated by the scheduling grant.

18. A first user equipment (UE) comprising:
    means for receiving, from a base station (BS), a first configuration indicating a first configured grant (CG) resource and a first transmission parameter associated with the first CG resource;
    means for determining a second transmission parameter for transmitting a data block in the first CG resource, the second transmission parameter being different from the first transmission parameter;
    means for transmitting, to the BS in the first CG resource, a transmission including the data block and configured grant-uplink control information (CG-UCI) indicating the second transmission parameter, the data block being based on the second transmission parameter, wherein the first CG resource is associated with a first traffic flow, and wherein the means for transmitting the transmission is configured to: transmit the data block associated with a second traffic flow different from the first traffic flow;
    means for receiving, from the BS, a second configuration for a second CG resource associated with the second traffic flow; and
    means for selecting the first CG resource for transmitting the data block based on at least one of an arrival time, or a hybrid automatic repeat request (HARQ) acknowledgement/negative-acknowledgement (ACK/NACK) feedback, or a retransmission timer associated with the data block.

* * * * *